(12) United States Patent
Anast

(10) Patent No.: US 10,364,047 B2
(45) Date of Patent: Jul. 30, 2019

(54) APPARATUS FOR MANIPULATING CURVED SHEETS USING MAGNETIC MEMBERS

(71) Applicant: THE BOEING COMPANY, Chicago, IL (US)

(72) Inventor: Peter Z. Anast, Honolulu, HI (US)

(73) Assignee: THE BOEING COMPANY, Chicago, IL (US)

( * ) Notice: Subject to any disclaimer, the term of this patent is extended or adjusted under 35 U.S.C. 154(b) by 229 days.

(21) Appl. No.: 15/461,865

(22) Filed: Mar. 17, 2017

(65) Prior Publication Data

US 2017/0190445 A1    Jul. 6, 2017

Related U.S. Application Data

(62) Division of application No. 13/965,572, filed on Aug. 13, 2013, now Pat. No. 9,604,319.

(51) Int. Cl.
*B23K 20/12* (2006.01)
*B64F 5/10* (2017.01)
(Continued)

(52) U.S. Cl.
CPC .............. *B64F 5/10* (2017.01); *B23K 20/126* (2013.01); *B23K 20/1245* (2013.01);
(Continued)

(58) Field of Classification Search
CPC .............. B23K 20/1245; B23K 20/126; B23K 2101/006; B23K 2101/18;
(Continued)

(56) References Cited

U.S. PATENT DOCUMENTS 2,941,491 A    6/1960  Lloyd
2,991,347 A    7/1961  Weinstein
(Continued)

FOREIGN PATENT DOCUMENTS

CN    101084087 A    12/2007
CN    101896398 A    11/2010
(Continued)

OTHER PUBLICATIONS

European Patent Office, search report for Application No. 14173179.4-1702 / 2837567, dated Apr. 1, 2015.
(Continued)

*Primary Examiner* — Erin B Saad
*Assistant Examiner* — Carlos J Gamino
(74) *Attorney, Agent, or Firm* — Patterson + Sheridan, LLP

(57) ABSTRACT

In one aspect of the disclosure, an apparatus for manipulating a plurality of curved sheets is provided. Each of the plurality of curved sheets includes an upper surface and a lower surface. The apparatus includes tooling to be coupled to the upper surface of each of the plurality of curved sheets. The tooling is capable of moving the plurality of curved sheets relative to each other and abutting the plurality of curved sheets so that the upper surface of each of the plurality of curved sheets is coextensive with a virtual arcuate surface. The apparatus also includes a welding apparatus capable of welding the plurality of curved sheets together after abutting the plurality of curved sheets.

20 Claims, 12 Drawing Sheets

(51) Int. Cl.
*B23K 37/04* (2006.01)
*B32B 7/04* (2019.01)
*B23K 26/28* (2014.01)
*B23K 26/20* (2014.01)
*B23K 101/00* (2006.01)
*B23K 101/18* (2006.01)

(52) U.S. Cl.
CPC .............. *B23K 26/20* (2013.01); *B23K 26/28* (2013.01); *B23K 37/0408* (2013.01); *B23K 37/0426* (2013.01); *B32B 7/04* (2013.01); *B23K 2101/006* (2018.08); *B23K 2101/18* (2018.08); *B23K 2101/185* (2018.08); *Y10T 428/12493* (2015.01)

(58) Field of Classification Search
CPC .. B23K 2101/185; B23K 26/20; B23K 26/28; B23K 37/0408; B23K 37/0426; B64F 5/10
See application file for complete search history.

(56) References Cited

U.S. PATENT DOCUMENTS

| | | | |
|---|---|---|---|
| 3,618,844 | A | 11/1971 | Morley et al. |
| 3,788,634 | A | 1/1974 | Chauvet et al. |
| 3,929,270 | A | 12/1975 | Keith |
| 4,759,981 | A | 7/1988 | Weil |
| 4,840,303 | A | 6/1989 | Fujii et al. |
| 5,023,427 | A | 6/1991 | Neiheisel et al. |
| 5,249,785 | A | 10/1993 | Nelson et al. |
| 5,266,770 | A | 11/1993 | Noe |
| 5,370,301 | A | 12/1994 | Belcher et al. |
| 5,536,915 | A | 7/1996 | Peru et al. |
| 5,615,483 | A | 4/1997 | Micale et al. |
| 6,127,646 | A | 10/2000 | Aebersold et al. |
| 6,189,764 | B1 | 2/2001 | Hannan |
| 6,328,261 | B1 | 12/2001 | Wollaston |
| 6,430,796 | B1 | 8/2002 | Jones et al. |
| 7,641,098 | B2 | 1/2010 | Weil |
| 7,866,532 | B1 | 1/2011 | Potter et al. |
| 8,157,155 | B2 | 4/2012 | Diez et al. |
| 9,015,930 | B2 | 4/2015 | Maeda et al. |
| 2001/0015369 | A1 | 8/2001 | Litwinski et al. |
| 2001/0054228 | A1 | 12/2001 | Lehmker et al. |
| 2002/0050508 | A1 | 5/2002 | Yoshinaga |
| 2006/0143890 | A1 | 7/2006 | Linnemann et al. |
| 2006/0191979 | A1 | 8/2006 | Lohwasser |
| 2008/0230584 | A1 | 9/2008 | Lederich et al. |
| 2009/0184201 | A1 | 7/2009 | Talwar |
| 2010/0192377 | A1 | 8/2010 | Stephan |
| 2012/0130528 | A1 | 5/2012 | Stark et al. |

FOREIGN PATENT DOCUMENTS

| | | |
|---|---|---|
| CN | 102802867 A | 11/2012 |
| CN | 102803812 A | 11/2012 |
| JP | 2001025886 A | 1/2001 |
| JP | 2001314997 A | 11/2001 |
| JP | 20057454 A | 1/2005 |
| JP | 2008523997 A | 7/2008 |
| JP | 2012525266 A | 10/2012 |
| JP | 2015036345 A | 2/2015 |
| WO | 9310935 | 6/1993 |
| WO | 2006066934 A1 | 6/2006 |
| WO | 2010125172 A2 | 11/2010 |

OTHER PUBLICATIONS

M. Torres Disenos Industriales Sau., MTorres Surface Milling Machine, http://www.mtorres.es/en/aeronautics/products/metallic/torres-surface-milling, 5 pages, published at least as early as Aug. 12, 2013.

APPARATUS FOR MANIPULATING CURVED SHEETS USING MAGNETIC MEMBERS

CROSS-REFERENCE TO RELATED APPLICATIONS

This application is a divisional of U.S. patent application Ser. No. 13/965,572, filed Aug. 13, 2013, now issued as U.S. Pat. No. 9,604,319. The aforementioned related patent application is herein incorporated by reference in its entirety.

BACKGROUND

Curved sheets are conventionally coupled together by overlapping edges of the curved sheets to form lap joints, fastened together, e.g., with rivets. Curved sheets are commonly coupled in this manner in aerospace applications and, in such an example, the curved sheets are metallic curved sheets and may form, e.g., part of a fuselage, a wing, a stabilizer or other aerodynamic surface. Using lap joints and/or splice plates when coupling curved sheets together requires additional material to provide overlap of the curved sheets, thereby increasing the weight and cost of the assembly.

SUMMARY

Accordingly, apparatuses and methods that reduce the cost of manufacturing of assemblies of curved sheets and the weight of such assemblies are desired.

One example of the present disclosure relates to an apparatus for manipulating a plurality of curved sheets. Each of the plurality of curved sheets includes an upper surface and a lower surface. The apparatus includes tooling to be coupled to the upper surface of each of the plurality of curved sheets. The tooling is capable of moving the plurality of curved sheets relative to each other and abutting the plurality of curved sheets so that the upper surface of each of the plurality of curved sheets is coextensive with a virtual arcuate surface.

In one example of the apparatus, which may include at least a portion of the subject matter of any of the preceding and/or following examples, the virtual arcuate surface includes no inflection points along a cross-section thereof perpendicular to a virtual straight line coextensive with the virtual arcuate surface.

In one example of the apparatus, which may include at least a portion of the subject matter of any of the preceding and/or following examples, the plurality of curved sheets, abutted so that the upper surface of each of the plurality of curved sheets is coextensive with the virtual arcuate surface, subtend a central angle between about 2 degrees and about 270 degrees in a virtual plane perpendicular to a virtual straight line coextensive with the virtual arcuate surface.

In one example of the apparatus, which may include at least a portion of the subject matter of any of the preceding and/or following examples, the plurality of curved sheets, abutted so that the upper surface of each of the plurality of curved sheets is coextensive with the virtual arcuate surface, subtend a central angle of about 180 degrees in a virtual plane perpendicular to a virtual straight line coextensive with the virtual arcuate surface.

In one example of the apparatus, which may include at least a portion of the subject matter of any of the preceding and/or following examples, the tooling includes at least one holder to be removably coupled to the upper surface of at least one of the plurality of curved sheets.

In one example of the apparatus, which may include at least a portion of the subject matter of any of the preceding and/or following examples, the at least one holder extends in a non-perpendicular direction relative to weight vectors of the plurality of curved sheets.

In one example of the apparatus, which may include at least a portion of the subject matter of any of the preceding and/or following examples, the at least one holder extends in a substantially parallel direction relative to weight vectors of the plurality of curved sheets.

In one example of the apparatus, which may include at least a portion of the subject matter of any of the preceding and/or following examples, the at least one holder extends in a substantially perpendicular direction relative to weight vectors of the plurality of curved sheets.

In one example of the apparatus, which may include at least a portion of the subject matter of any of the preceding and/or following examples, the at least one holder has a selectively variable length.

In one example of the apparatus, which may include at least a portion of the subject matter of any of the preceding and/or following examples, the tooling includes at least one first holder and at least one second holder.

In one example of the apparatus, which may include at least a portion of the subject matter of any of the preceding and/or following examples, the at least one first holder and the at least one second holder extend in different directions.

In one example of the apparatus, which may include at least a portion of the subject matter of any of the preceding and/or following examples, the tooling is reconfigurable.

In one example, which may include at least a portion of the subject matter of any of the preceding and/or following examples, the apparatus also includes a processing station facing the lower surfaces of the plurality of curved sheets.

In one example of the apparatus, which may include at least a portion of the subject matter of any of the preceding and/or following examples, the processing station includes a subtractive-manufacturing apparatus.

In one example of the apparatus, which may include at least a portion of the subject matter of any of the preceding and/or following examples, the subtractive-manufacturing apparatus includes a drilling apparatus.

In one example of the apparatus, which may include at least a portion of the subject matter of any of the preceding and/or following examples, the processing station includes a laser-welding apparatus.

In one example, which may include at least a portion of the subject matter of any of the preceding and/or following examples, the apparatus also includes a carriage configured to move relative to the plurality of curved sheets and the processing station is coupled to and moveable with the carriage.

In one example of the apparatus, which may include at least a portion of the subject matter of any of the preceding and/or following examples, the processing station includes a friction-stir-welding apparatus.

In one example, which may include at least a portion of the subject matter of any of the preceding and/or following examples, the apparatus also includes a first magnetic member to be associated with the upper surface of a first curved sheet of the plurality of curved sheets adjacent an edge of the first curved sheet, a second magnetic member to be associated with the lower surface of the first curved sheet adjacent the edge of the first curved sheet, a third magnetic member to be associated with the upper surface of a second curved sheet of the plurality of curved sheets adjacent an edge of the second curved sheet, and a fourth magnetic member to be associated with the lower surface of the second curved sheet adjacent the edge of the second curved sheet. The first magnetic member is to be magnetically coupled to the second magnetic member and the third magnetic member is to be magnetically coupled to the fourth magnetic member with the edge of the first curved sheet and the edge of the second curved sheet abutting each other.

In one example, which may include at least a portion of the subject matter of any of the preceding and/or following examples, the apparatus also includes a flexible joining member to be installed between the first magnetic member and the third magnetic member or between the second magnetic member and the fourth magnetic member to provide a coupling between the first curved sheet and the second curved sheet with the edge of the first curved sheet and the edge of the second curved sheet abutting each other.

In one example, which may include at least a portion of the subject matter of any of the preceding and/or following examples, the apparatus also includes a decoupling member rotatably attached to the friction-stir-welding apparatus to eliminate the coupling provided by the flexible joining member between the first curved sheet and the second curved sheet.

In one example of the apparatus, which may include at least a portion of the subject matter of any of the preceding and/or following examples, the decoupling member decouples the flexible joining member from the first curved sheet and the second curved sheet while the first curved sheet and the second curved sheet are welded together by the friction-stir-welding apparatus.

In one example of the apparatus, which may include at least a portion of the subject matter of any of the preceding and/or following examples, the decoupling member translates but does not rotate relative to the first curved sheet and the second curved sheet.

In one example of the apparatus, which may include at least a portion of the subject matter of any of the preceding and/or following examples, the decoupling member is to be at least partially positioned in a space between the first magnetic member and the third magnetic member.

In one example of the apparatus, which may include at least a portion of the subject matter of any of the preceding and/or following examples, the decoupling member is to move along the space and is at least partially retained in the space by the first magnetic member and the third magnetic member.

In one example of the apparatus, which may include at least a portion of the subject matter of any of the preceding and/or following examples, the decoupling member movably engages at least one of the first magnetic member and the third magnetic member.

In one example of the apparatus, which may include at least a portion of the subject matter of any of the preceding and/or following examples, the friction-stir-welding apparatus is to be at least partially positioned in the space.

In one example, which may include at least a portion of the subject matter of any of the preceding and/or following examples, the apparatus also includes a rigid joining member to be coupled to the first curved sheet and to the second curved sheet with the edge of the first curved sheet and the edge of the second curved sheet abutting each other. The rigid joining member includes a curvature.

In one example, which may include at least a portion of the subject matter of any of the preceding and/or following examples, the apparatus also includes a carriage configured to move relative to the first curved sheet and the second curved sheet. The friction-stir-welding apparatus is coupled to and moveable with the carriage.

In one example of the apparatus, which may include at least a portion of the subject matter of any of the preceding and/or following examples, the second magnetic member and fourth magnetic member are coupled to and are moveable with the carriage. The first magnetic member and third magnetic member remain stationary relative to the plurality of curved sheets.

In one example, which may include at least a portion of the subject matter of any of the preceding and/or following examples, the apparatus also includes a first magnetic member to be associated with the upper surface of one of the plurality of curved sheets adjacent an edge of the one of the plurality of curved sheets and a second magnetic member to be associated with the lower surface of one of the plurality of curved sheets adjacent an edge of the one of the plurality of curved sheets. The first magnetic member is to be magnetically coupled to the second magnetic member.

In one example of the apparatus, which may include at least a portion of the subject matter of any of the preceding and/or following examples, the first magnetic member and the second magnetic member are to be associated with a same one of the plurality of curved sheets.

One example of the present disclosure relates to an apparatus for constraining an edge of a first curved sheet and an edge of a second curved sheet. The apparatus includes a first magnetic member to be associated with an upper surface of the first curved sheet, a second magnetic member to be associated with a lower surface of the first curved sheet, a third magnetic member to be associated with an upper surface of the second curved sheet, and a fourth magnetic member to be associated with a lower surface of the second curved sheet. The first magnetic member is to be magnetically coupled to the second magnetic member and the third magnet member is to be magnetically coupled to the fourth magnetic member with the edge of the first curved sheet and the edge of the second curved sheet abutting each other.

In one example of the apparatus, which may include at least a portion of the subject matter of any of the preceding and/or following examples, the first magnetic member and the second magnetic member conform to the first curved sheet, and the third magnetic member and the fourth magnetic member conform to the second curved sheet.

In one example of the apparatus, which may include at least a portion of the subject matter of any of the preceding and/or following examples, at least two of the first magnetic member, the second magnetic member, the third magnetic member, and the fourth magnetic member have a compliant shape.

In one example of the apparatus, which may include at least a portion of the subject matter of any of the preceding and/or following examples, the first curved sheet and the second curved sheet are curved metallic sheets.

In one example of the apparatus, which may include at least a portion of the subject matter of any of the preceding and/or following examples, the first magnetic member and the second magnetic member are located adjacent the edge of the first curved sheet, and the third magnetic member and the fourth magnetic member are located adjacent the edge of the second curved sheet.

In one example of the apparatus, which may include at least a portion of the subject matter of any of the preceding and/or following examples, the first magnetic member, the second magnetic member, the third magnetic member, and the fourth magnetic member comprise permanent magnets.

In one example of the apparatus, which may include at least a portion of the subject matter of any of the preceding and/or following examples, one of the first magnetic member and the second magnetic member comprises a permanent magnet and another of the first magnetic member and the second magnetic member comprises a ferromagnetic material, and one of the third magnetic member and the fourth magnetic member comprises a permanent magnet and another of the third magnetic member and the fourth magnetic member comprises a ferromagnetic material.

In one example of the apparatus, which may include at least a portion of the subject matter of any of the preceding and/or following examples, at least one of the first magnetic member and the second magnetic member comprises an electro-magnet, and at least one of the third magnetic member and the fourth magnetic member comprises an electro-magnet.

In one example, which may include at least a portion of the subject matter of any of the preceding and/or following examples, the apparatus also includes a joining member to be coupled to the first curved sheet and the second curved sheet.

In one example of the apparatus, which may include at least a portion of the subject matter of any of the preceding and/or following examples, the joining member is a flexible joining member to be installed between one of the first magnetic member and the third magnetic member or the second magnetic member and the fourth magnetic member to provide a coupling between the first curved sheet and the second curved sheet with the edge of the first curved sheet and the edge of the second curved sheet abutting each other.

In one example of the apparatus, which may include at least a portion of the subject matter of any of the preceding and/or following examples, the flexible joining member is to be installed between the first magnetic member and the third magnetic member.

In one example of the apparatus, which may include at least a portion of the subject matter of any of the preceding and/or following examples, the flexible joining member is to be installed between the second magnetic member and the fourth magnetic member.

In one example of the apparatus, which may include at least a portion of the subject matter of any of the preceding and/or following examples, the flexible joining member includes adhesive on at least a portion thereof, and the flexible joining member is to be coupled to the first curved sheet and the second curved sheet with the adhesive.

In one example of the apparatus, which may include at least a portion of the subject matter of any of the preceding and/or following examples, the adhesive is located on the joining member adjacent a first edge and a second edge of the joining member. The first edge and the second edge oppose one another, with the first edge to be adhesively coupled to the first curved sheet and the second edge to be adhesively coupled to the second curved sheet.

In one example of the apparatus, which may include at least a portion of the subject matter of any of the preceding and/or following examples, the flexible joining member includes a portion lacking adhesive. The portion lacking adhesive is between the first edge and the second edge of the flexible joining member and is to at least partially overlap the edge of the first curved sheet and the edge of the second curved sheet, with the edge of the first curved sheet and the edge of the second curved sheet abutting each other.

In one example of the apparatus, which may include at least a portion of the subject matter of any of the preceding and/or following examples, the joining member is a rigid joining member to be coupled to the first curved sheet and the second curved sheet.

In one example of the apparatus, which may include at least a portion of the subject matter of any of the preceding and/or following examples, the rigid joining member is to be coupled to the upper surface of the first curved sheet and the upper surface of the second curved sheet.

In one example of the apparatus, which may include at least a portion of the subject matter of any of the preceding and/or following examples, the rigid joining member is to be coupled to the lower surface of the first curved sheet and the lower surface of the second curved sheet.

In one example of the apparatus, which may include at least a portion of the subject matter of any of the preceding and/or following examples, the rigid joining member includes a slot.

In one example of the apparatus, which may include at least a portion of the subject matter of any of the preceding and/or following examples, the rigid joining member is curved.

In one example of the apparatus, which may include at least a portion of the subject matter of any of the preceding and/or following examples, the joining member is a first joining member. The apparatus also includes a second joining member that is to be coupled to the first curved sheet and the second curved sheet, with the edge of the first curved sheet and the edge of the second curved sheet abutting each other.

In one example of the apparatus, which may include at least a portion of the subject matter of any of the preceding and/or following examples, the first joining member is a rigid joining member and the second joining member is a flexible joining member.

In one example of the apparatus, which may include at least a portion of the subject matter of any of the preceding and/or following examples, a space is to be provided between the first magnetic member and the third magnetic member. The apparatus also includes a joining member to be coupled to the first curved sheet and the second curved sheet and to extend at least partially across the space between the first magnetic member and the third magnetic member.

In one example, which may include at least a portion of the subject matter of any of the preceding and/or following examples, the apparatus also includes a carriage configured to move relative to the first curved sheet and the second curved sheet. The second magnetic member and the fourth magnetic member are coupled to the carriage.

In one example of the apparatus, which may include at least a portion of the subject matter of any of the preceding and/or following examples, the second magnetic member and the fourth magnetic member are to move with the carriage relative to the first curved sheet and the second curved sheet, and the first magnetic member and the third magnetic member remain stationary relative to the first curved sheet and the second curved sheet.

In one example, which may include at least a portion of the subject matter of any of the preceding and/or following examples, the apparatus also includes at least one friction-reducing member. At least a portion of the at least one friction-reducing member is between at least one of the second magnetic member and the fourth magnetic member and at least one of the first curved sheet and the second curved sheet.

In one example of the apparatus, which may include at least a portion of the subject matter of any of the preceding and/or following examples, the friction-reducing member is a wheel.

In one example of the apparatus, which may include at least a portion of the subject matter of any of the preceding and/or following examples, a spacing between a portion of the at least one of the second magnetic member and the fourth magnetic member and the at least one of the first curved sheet and the second curved sheet is maintained with the friction reducing member engaging at least one of the first curved sheet and the second curved sheet.

In one example of the apparatus, which may include at least a portion of the subject matter of any of the preceding and/or following examples, the friction-reducing member is a layer of material applied to a surface of one of the second magnetic member and the fourth magnetic member.

In one example of the apparatus, which may include at least a portion of the subject matter of any of the preceding and/or following examples, the first magnetic member includes a substrate configured to engage the upper surface of the first curved sheet and the third magnetic member includes a substrate configured to engage the upper surface of the second curved sheet.

In one example of the apparatus, which may include at least a portion of the subject matter of any of the preceding and/or following examples, the substrate of the first magnetic member is to conform to the first curved sheet and the substrate of the third magnetic member is to conform to the second curved sheet.

In one example of the apparatus, which may include at least a portion of the subject matter of any of the preceding and/or following examples, the substrate of the first magnetic member and the substrate of the third magnetic member are flexible.

In one example of the apparatus, which may include at least a portion of the subject matter of any of the preceding and/or following examples, the first magnetic member includes a plurality of magnetic tiles coupled to the substrate of the first magnetic member, and the third magnetic member includes a plurality of magnetic tiles coupled to the substrate of the third magnetic member.

In one example of the apparatus, which may include at least a portion of the subject matter of any of the preceding and/or following examples, the plurality of magnetic tiles coupled to the substrate of the first magnetic member are spaced apart from one another, and the plurality of magnetic tiles coupled to the substrate of the third magnetic member are spaced apart from one another.

One example of the present disclosure relates to a vehicle including a substructure and a weldment coupled to the substructure. The weldment includes a first sheet, a second sheet, and a butt weld between the first sheet and the second sheet. The butt weld is formed before the weldment is coupled to the substructure.

In one example of the vehicle, which may include at least a portion of the subject matter of any of the preceding and/or following examples, the vehicle is an airplane.

In one example of the vehicle, which may include at least a portion of the subject matter of any of the preceding and/or following examples, the substructure is at least a portion of a frame of the airplane. The first sheet is one of a first metallic fuselage sheet, a first metallic wing sheet, and a first metallic stabilizer sheet. The second sheet is a second metallic fuselage sheet, a second metallic wing sheet, and a second metallic stabilizer sheet.

In one example of the vehicle, which may include at least a portion of the subject matter of any of the preceding and/or following examples, the first sheet is a first metallic sheet and the second sheet is a second metallic sheet.

One example of the present disclosure relates to a method of manufacturing an assembly including a first curved sheet and a second curved sheet. The first curved sheet includes a first upper surface and a first edge. The second curved sheet includes a second upper surface and a second edge. The method includes supporting the first upper surface and the second upper surface, abutting the first edge and the second edge so that the first upper surface and the second upper surface are coextensive with a virtual arcuate surface, and welding the first edge and the second edge together to create a weldment after abutting the first edge and the second edge.

In one example of the method, which may include at least a portion of the subject matter of any of the preceding and/or following examples, the virtual arcuate surface includes no inflection points along a cross-section thereof perpendicular to a virtual straight line coextensive with the virtual arcuate surface.

In one example, which may include at least a portion of the subject matter of any of the preceding and/or following examples, the method also includes reconfiguring tooling supporting the first upper surface and the second upper surface.

In one example, which may include at least a portion of the subject matter of any of the preceding and/or following examples, the method also includes positioning a processing station to face a first lower surface of the first curved sheet and a second lower surface of the second curved sheet.

In one example, which may include at least a portion of the subject matter of any of the preceding and/or following examples, the method also includes moving the processing station relative to the first curved sheet and the second curved sheet.

In one example of the method, which may include at least a portion of the subject matter of any of the preceding and/or following examples, positioning the processing station includes positioning a friction-stir-welding apparatus to face the first lower surface and the second lower surface.

In one example, which may include at least a portion of the subject matter of any of the preceding and/or following examples, the method also includes locating a first magnetic member relative to the first upper surface adjacent the first edge, locating a second magnetic member relative to the first lower surface adjacent the first edge, locating a third magnetic member relative to the second upper surface adjacent the second edge, locating a fourth magnetic member relative to the second lower surface adjacent the second edge, and magnetically coupling the first magnetic member to the second magnetic member and the third magnetic member to the fourth magnetic member after abutting the first edge and the second edge.

In one example, which may include at least a portion of the subject matter of any of the preceding and/or following examples, the method also includes coupling a flexible joining member to the first curved sheet and to the second curved sheet between at least one of the first magnetic member and the third magnetic member or the second magnetic member and the fourth magnetic member after abutting the first edge and the second edge.

In one example, which may include at least a portion of the subject matter of any of the preceding and/or following examples, the method also includes decoupling the flexible joining member from the first curved sheet and the second curved.

In one example of the method, which may include at least a portion of the subject matter of any of the preceding and/or following examples, decoupling further includes decoupling the flexible joining member from the first curved sheet and the second curved sheet while welding the first edge and the second edge.

In one example, which may include at least a portion of the subject matter of any of the preceding and/or following examples, the method also includes rotatably coupling a decoupling member to the friction-stir-welding apparatus.

In one example, which may include at least a portion of the subject matter of any of the preceding and/or following examples, the method also includes coupling a rigid joining member to the first curved sheet and the second curved sheet after abutting the first edge and the second edge. The rigid joining member includes a curvature.

In one example, which may include at least a portion of the subject matter of any of the preceding and/or following examples, the method also includes moving the friction-stir-welding apparatus relative to the first curved sheet and the second curved sheet.

In one example, which may include at least a portion of the subject matter of any of the preceding and/or following examples, the method also includes moving the second magnetic member and fourth magnetic member relative to the first curved sheet and the second curved sheet.

In one example, which may include at least a portion of the subject matter of any of the preceding and/or following examples, the method also includes locating a first magnetic member relative to at least one of the first upper surface and the second upper surface adjacent at least one of the first edge and the second edge, locating a second magnetic member relative to at least one of a first lower surface of the first curved sheet and a second lower surface of the second curved sheet adjacent at least one of the first edge and the second edge, and magnetically coupling the first magnetic member to the second magnetic member.

In one example, which may include at least a portion of the subject matter of any of the preceding and/or following examples, the method also includes locating the first magnetic member and the second magnetic member relative to a same one of the first curved sheet and the second curved sheet.

In one example, which may include at least a portion of the subject matter of any of the preceding and/or following examples, the method also includes providing a space between the first edge and the second edge. The space is sufficient to process at least one of the first edge and the second edge. The method also includes processing at least one of the first edge and the second edge.

In one example of the method, which may include at least a portion of the subject matter of any of the preceding and/or following examples, abutting the first edge and the second edge occurs subsequent to processing at least one of the first edge and the second edge.

In one example of the method, which may include at least a portion of the subject matter of any of the preceding and/or following examples, supporting the first upper surface and the second upper surface further includes coupling tooling to the first upper surface and the second upper surface.

In one example, which may include at least a portion of the subject matter of any of the preceding and/or following examples, the method also includes moving the first curved sheet and the second curved sheet relative to each other with the tooling.

In one example of the method, which may include at least a portion of the subject matter of any of the preceding and/or following examples, abutting further includes abutting the first edge and the second edge with the tooling.

In one example, which may include at least a portion of the subject matter of any of the preceding and/or following examples, the method also includes coupling the weldment to a structure.

In one example of the method, which may include at least a portion of the subject matter of any of the preceding and/or following examples, the structure is at least a portion of a frame of an aircraft.

In one example, which may include at least a portion of the subject matter of any of the preceding and/or following examples, the method also includes processing the weldment.

In one example of the method, which may include at least a portion of the subject matter of any of the preceding and/or following examples, processing the weldment includes performing gauge reduction on at least a portion of the weldment.

In one example of the method, which may include at least a portion of the subject matter of any of the preceding and/or following examples, processing the weldment includes reducing the thickness of at least a portion of the weldment.

In one example of the method, which may include at least a portion of the subject matter of any of the preceding and/or following examples, processing the weldment includes trimming at least a portion of the weldment.

In one example, which may include at least a portion of the subject matter of any of the preceding and/or following examples, the method also includes constraining the first edge and the second edge subsequent to abutting the first edge and the second edge and prior to welding.

BRIEF DESCRIPTION OF THE DRAWINGS

Figure 1:
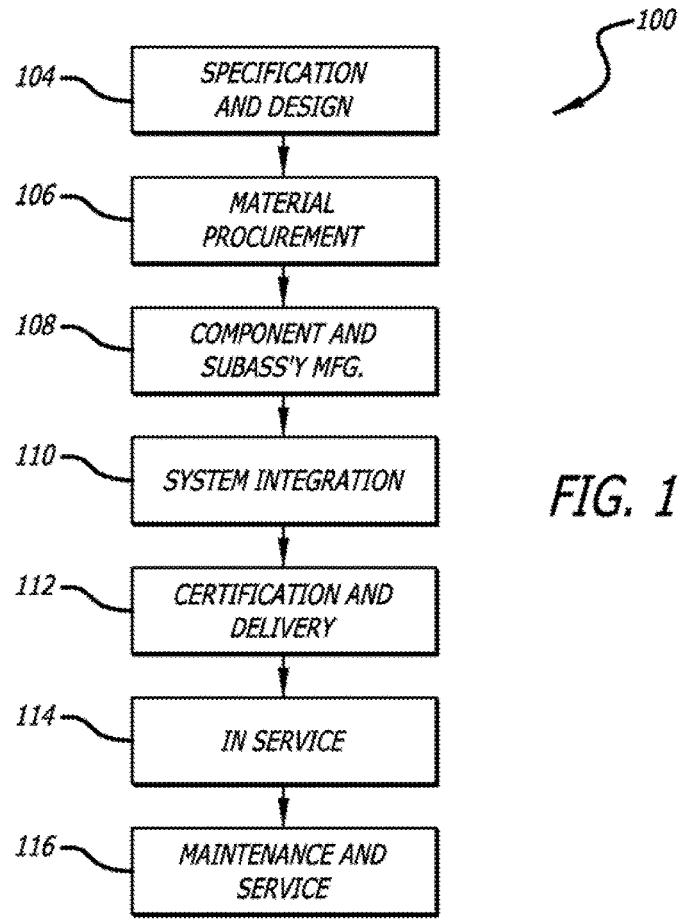
Figure 2:
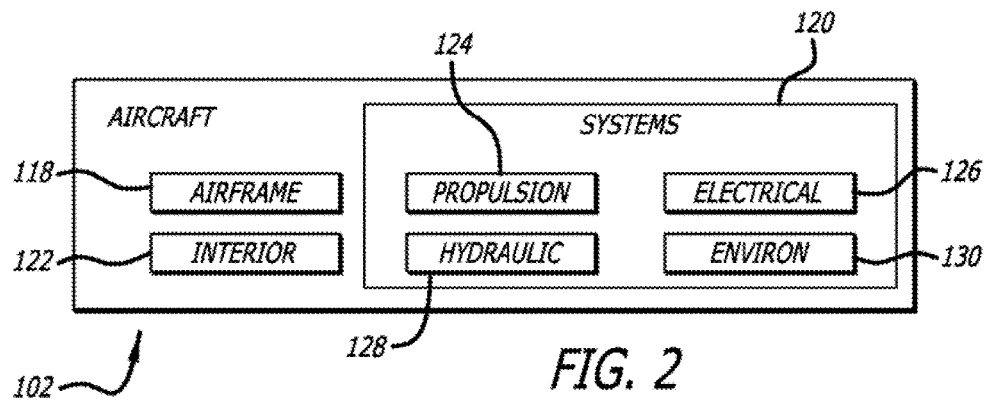
Figure 3:
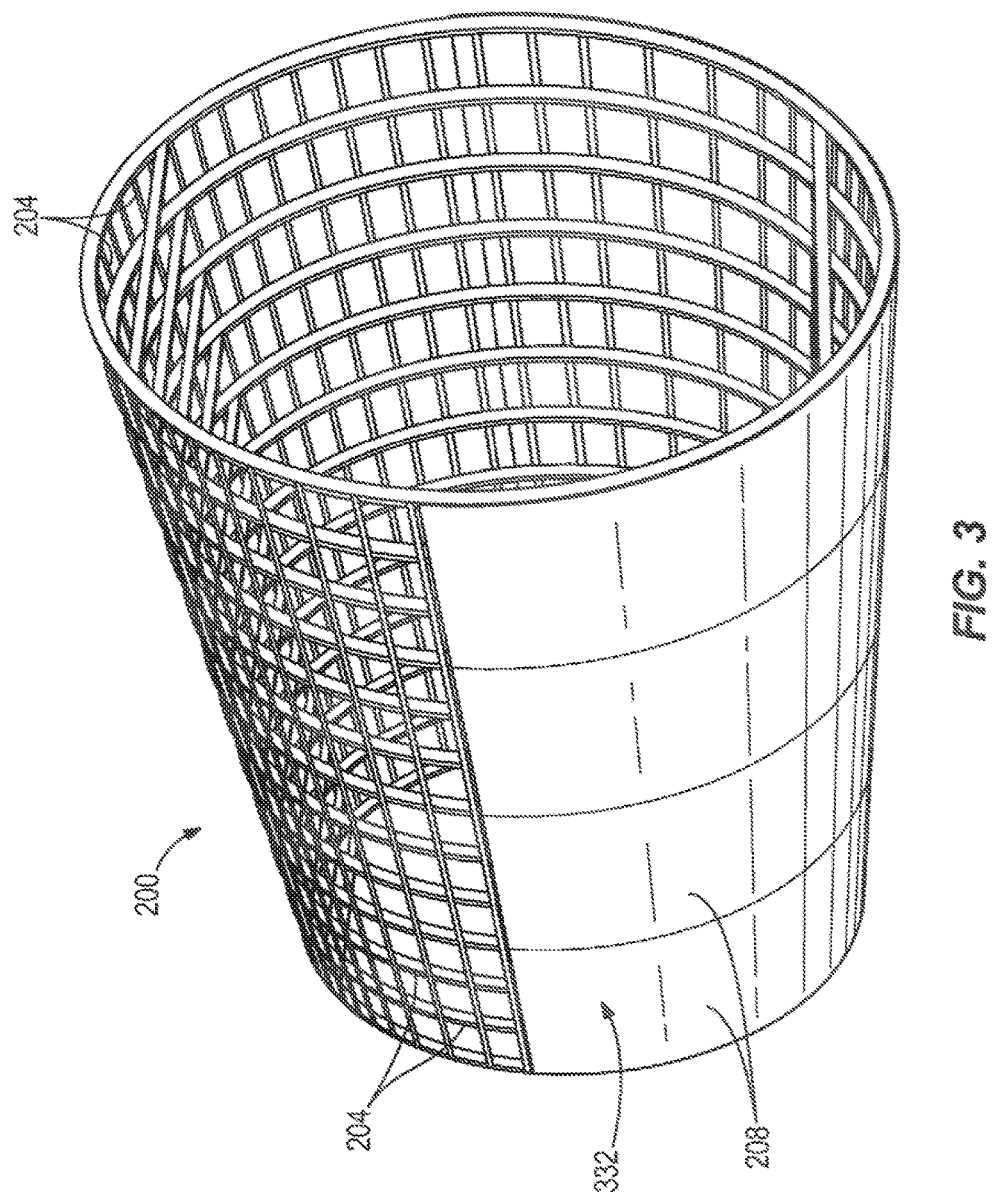

Having thus described examples of the disclosure in general terms, reference will now be made to the accompanying drawings, which are not necessarily drawn to scale, and wherein like reference characters designate the same or similar parts throughout the several views, and wherein:

FIG. 1 is a flow diagram of aircraft production and service methodology;

FIG. 2 is a block diagram of an aircraft;

FIG. 3 is a perspective view of a portion of a vehicle such as, for example, an aircraft, according to an aspect of the present disclosure.

Figure 4:
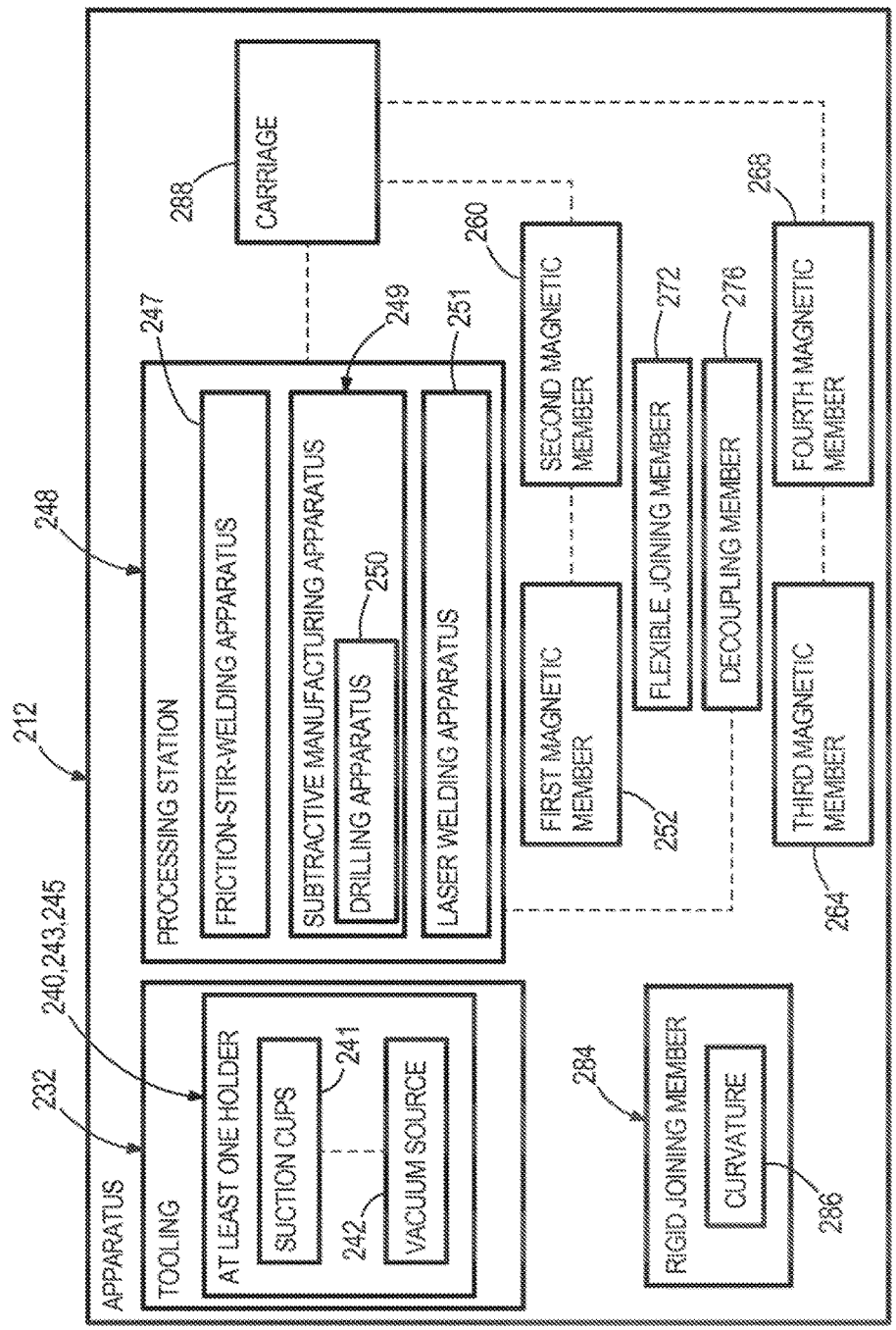
Figure 5:
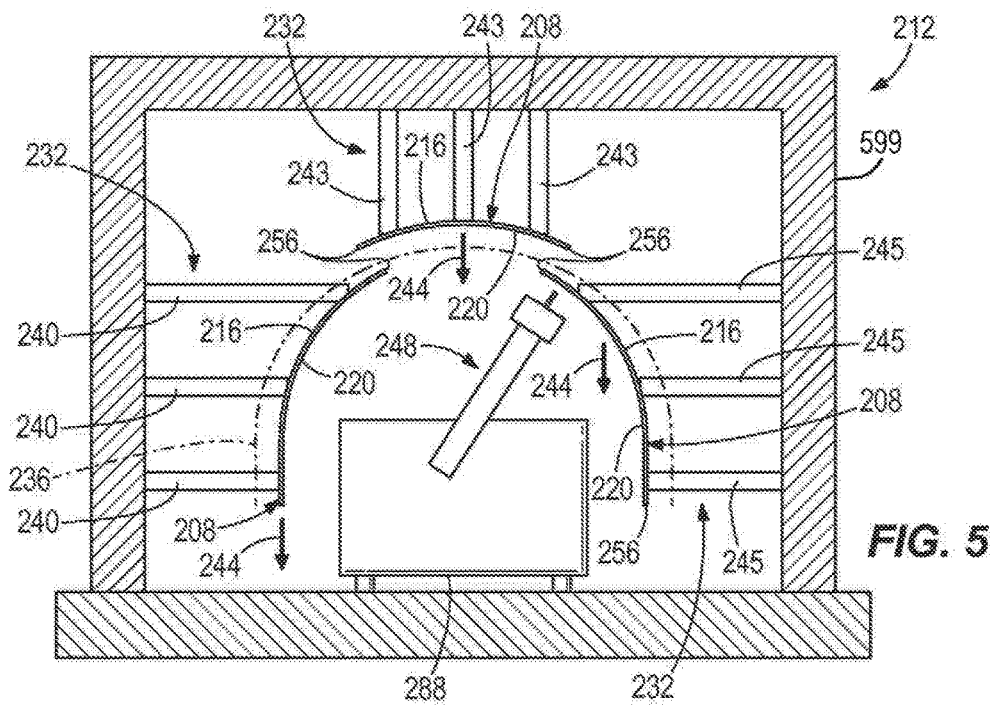
Figure 6:
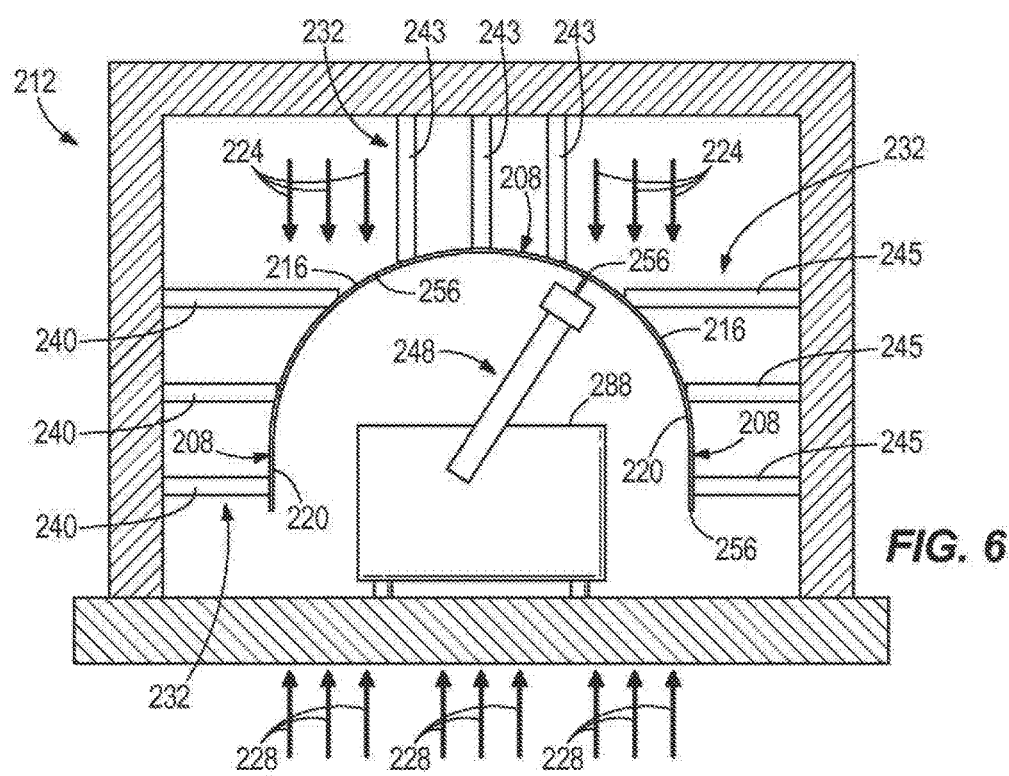
Figure 7:
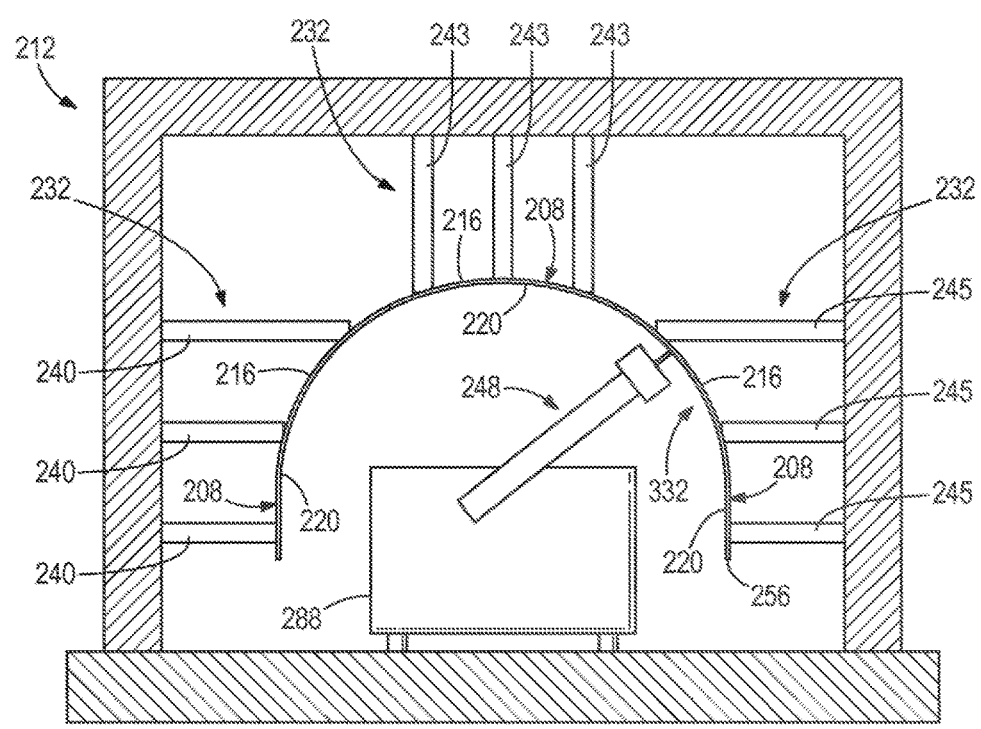
Figure 8:
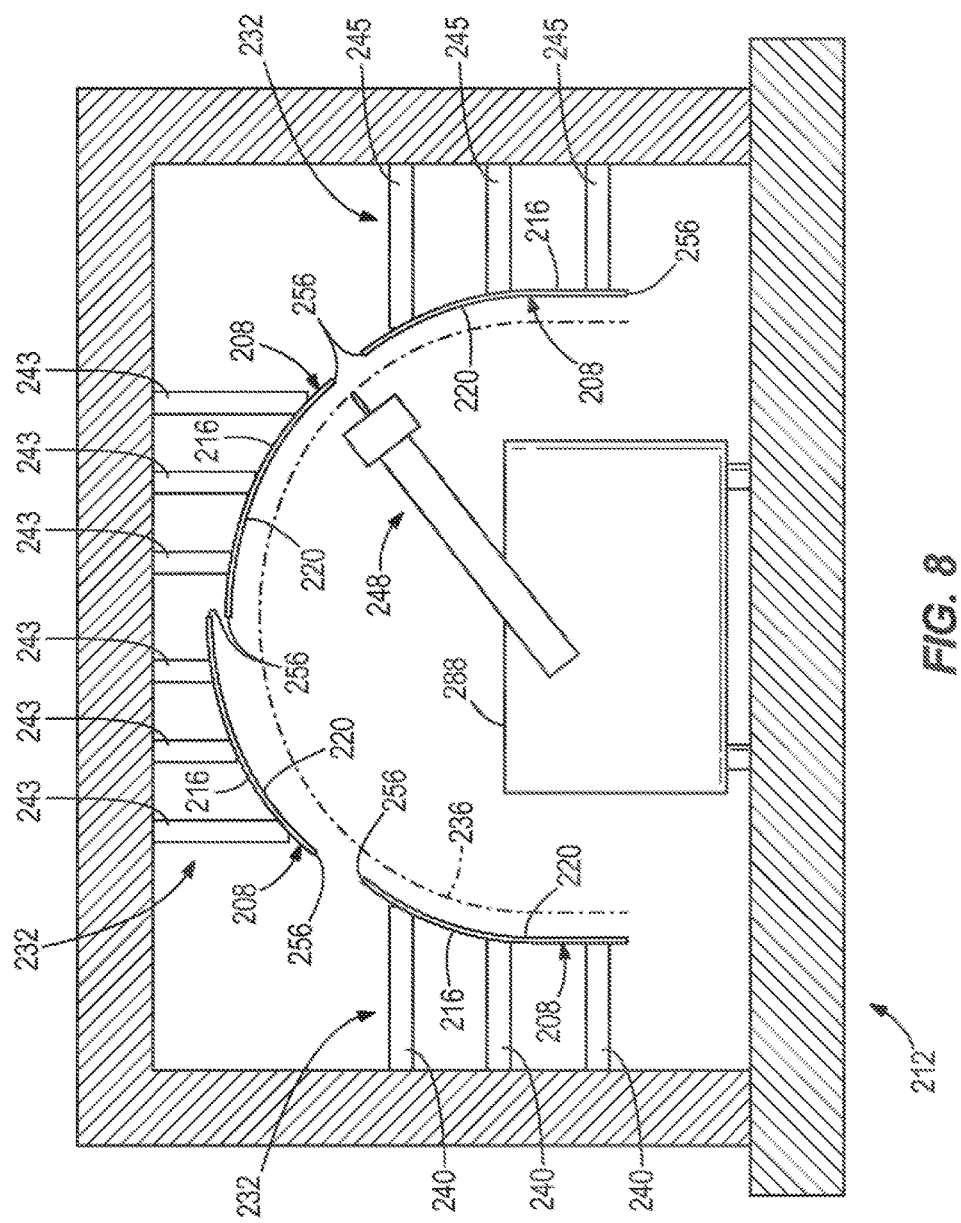
Figure 9:
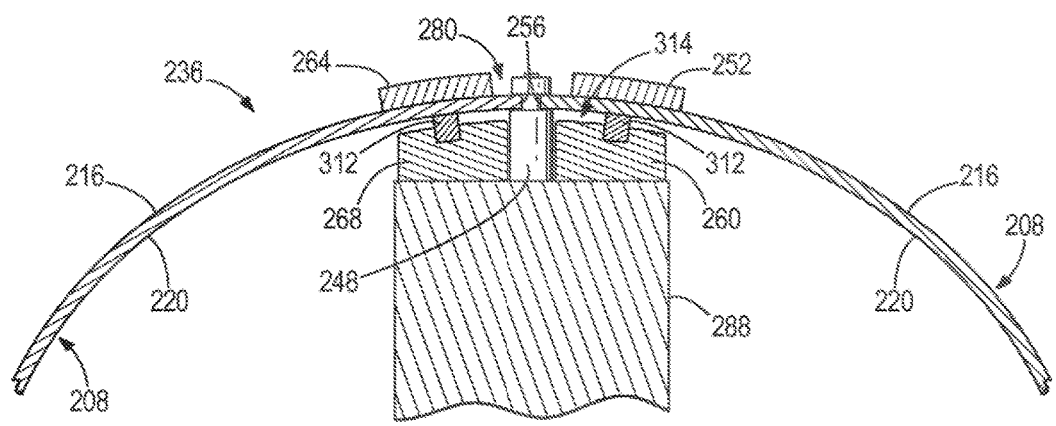
Figure 10:
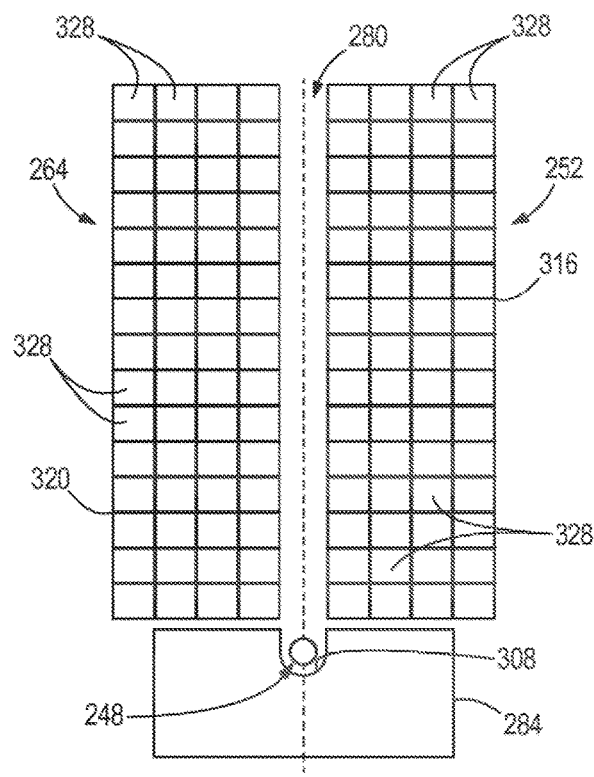
Figure 11:
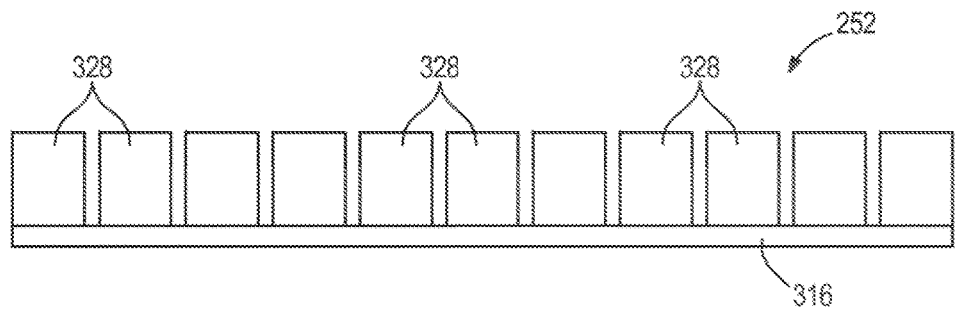
Figure 12:
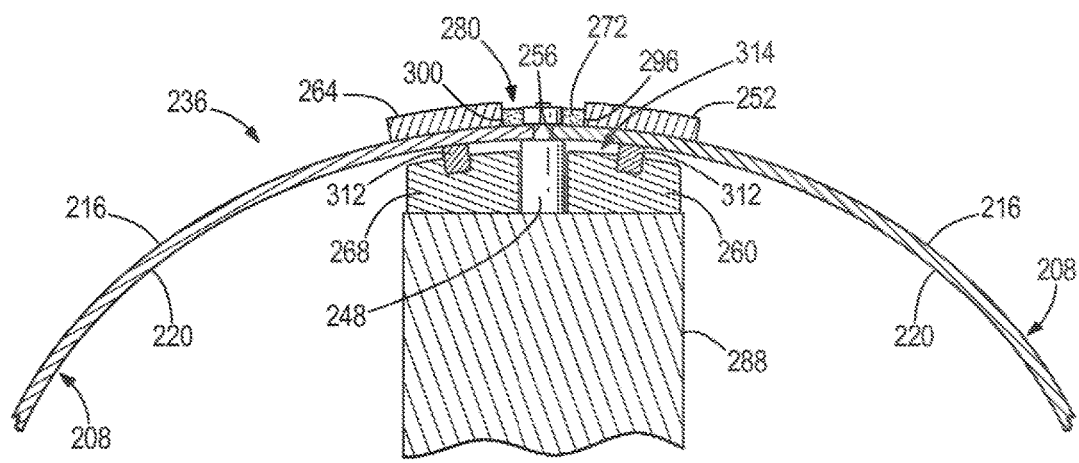
Figure 13:
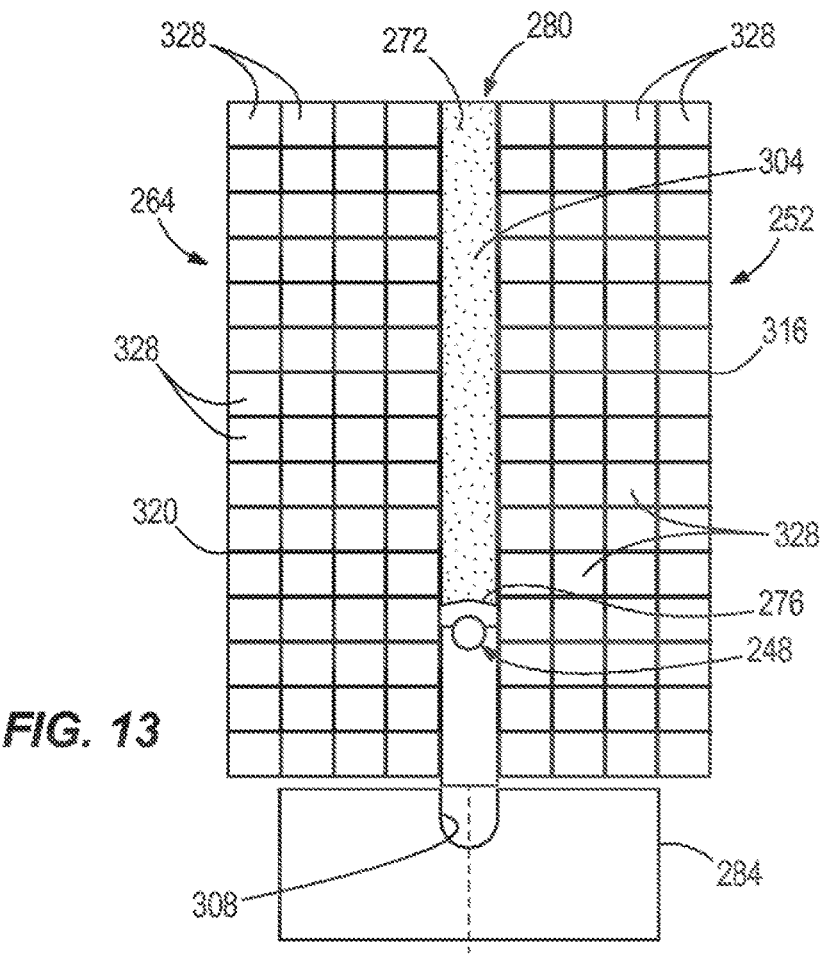
Figure 14:
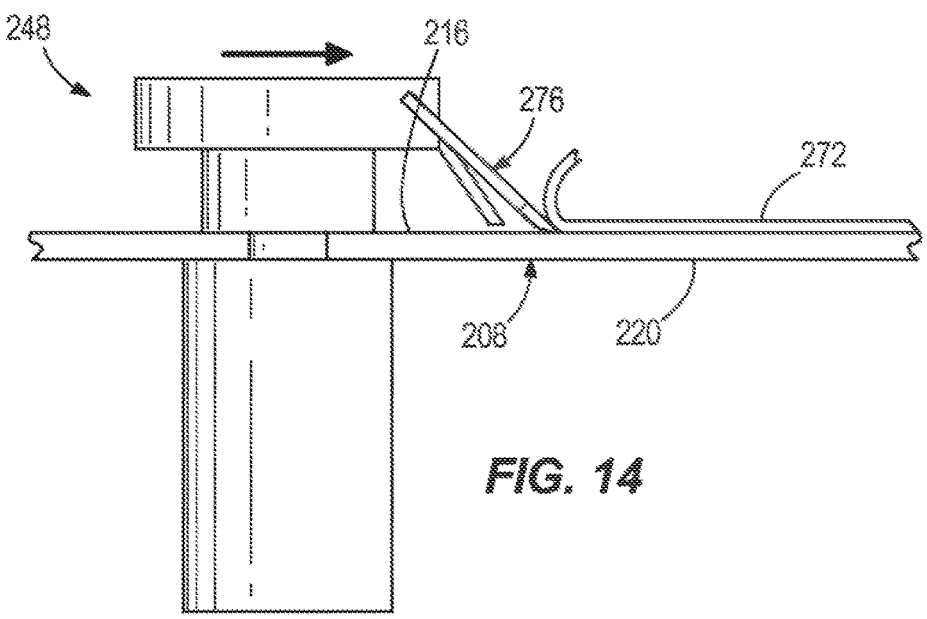
Figure 15:
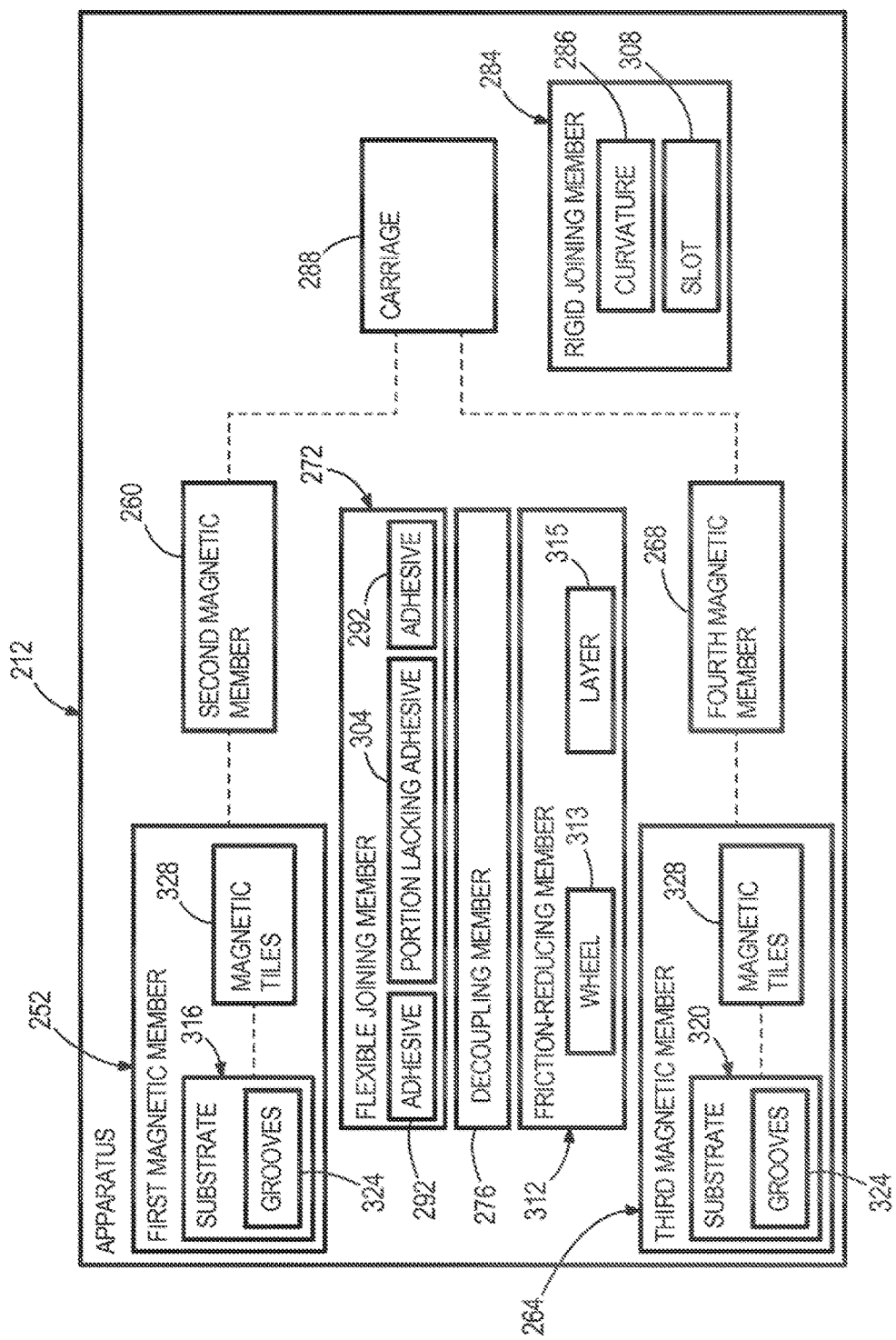
Figure 16:
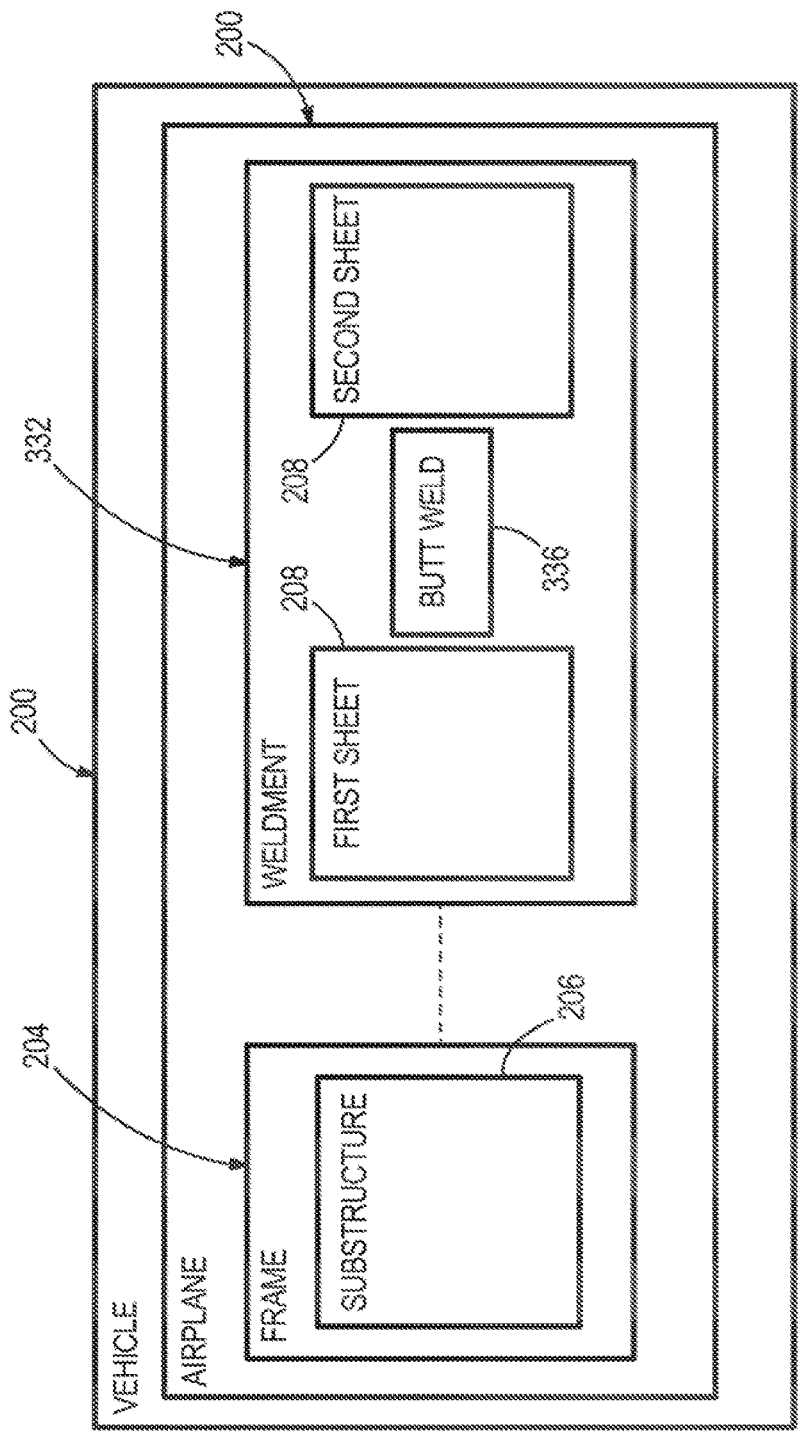
Figure 17:
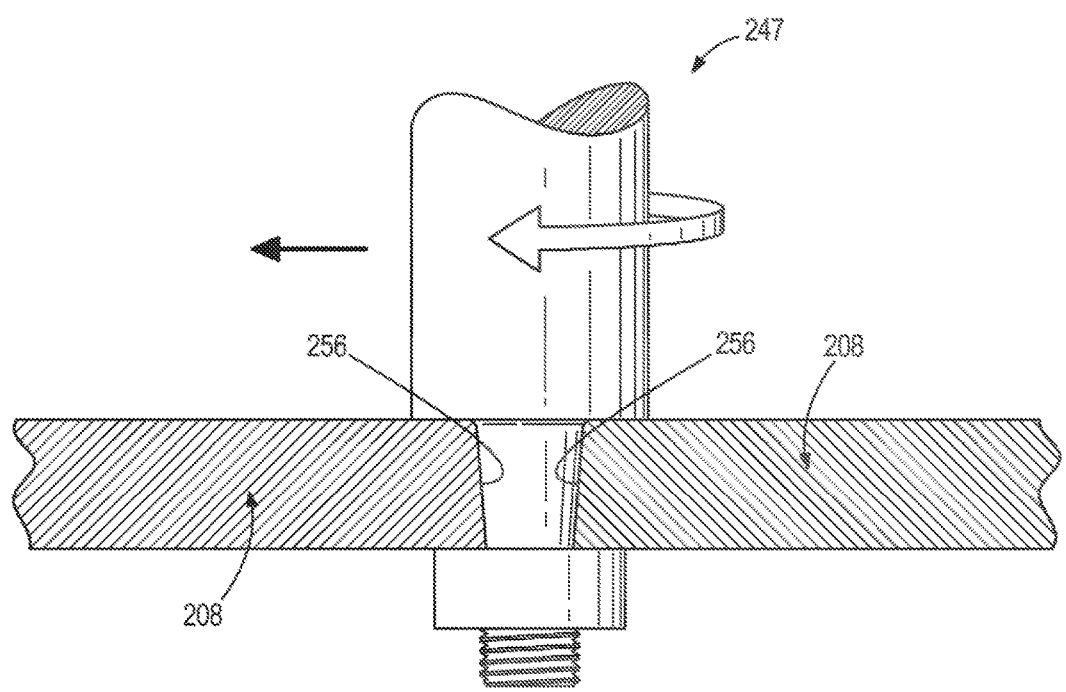

FIG. 4 is a block diagram of an apparatus, according to an aspect of the present disclosure;

FIG. 5 is a schematic elevational view of an apparatus including tooling for supporting a plurality of curved sheets, according to an aspect of the present disclosure;

FIG. 6 is an elevational view of the apparatus shown in FIG. 5, according to an aspect of the present disclosure;

FIG. 7 is a schematic elevational view of the apparatus shown in FIG. 5, according to an aspect of the present disclosure;

FIG. 8 is a schematic elevational view of an apparatus including tooling for supporting a plurality of curved sheets, according to an aspect of the present disclosure;

FIG. 9 is a schematic elevational view of an apparatus, according to an aspect of the present disclosure;

FIG. 10 is a schematic top view of a portion of the apparatus shown in FIG. 9, according to an aspect of the present disclosure;

FIG. 11 is a schematic side view of a portion of the apparatus shown in FIG. 10, according to an aspect of the present disclosure;

FIG. 12 is a schematic elevational view of an apparatus, according to an aspect of the present disclosure;

FIG. 13 is a schematic top view of a portion of the apparatus shown in FIG. 12, according to an aspect of the present disclosure;

FIG. 14 is a schematic elevational view of a portion of the apparatus shown in FIGS. 12 and 13, according to an aspect of the present disclosure;

FIG. 15 is a block diagram of an apparatus, according to an aspect of the present disclosure;

FIG. 16 is a block diagram of a vehicle, according to an aspect of the present disclosure; and FIG. 17 is a schematic elevational view of a portion of a friction-stir welding apparatus, according to an aspect of the present disclosure.

DETAILED DESCRIPTION

Examples of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft take place. Thereafter, the aircraft 102 may go through certification and delivery 112 to be placed in service 114. While in service by a customer, the aircraft 102 is scheduled for routine maintenance and service 116 (which may also include modification, reconfiguration, refurbishment, and so on).

Each of the processes of the illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 102 produced by the illustrative method 100 may include an airframe 118 with a plurality of high-level systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods shown or described herein may be employed during any one or more of the stages of the manufacturing and service method 100. For example, components or subassemblies corresponding to component and subassembly manufacturing 108 may be fabricated or manufactured in a manner similar to components or subassemblies produced while the aircraft 102 is in service. Also, one or more aspects of the apparatus, method, or combination thereof may be utilized during the production states 108 and 110, for example, by substantially expediting assembly of or reducing the cost of an aircraft 102. Similarly, one or more of apparatus or method realizations, or a combination thereof, may be utilized, for example and without limitation, while the aircraft 102 is in service, e.g., maintenance and service 116.

With reference to FIG. 3, one example of the disclosure relates to a vehicle 200, such as an aircraft 200 (a portion thereof shown in FIG. 3). The vehicle 200 may include a substructure 206 and a plurality of sheets 208. The substructure 206 may be at least a portion of a frame 204 of the vehicle 200 and the plurality of sheets 208 may be curved. The plurality of sheets 208 may also be metallic.

Referring now to FIGS. 4-8, one example of the present disclosure relates to an apparatus 212 including a housing 599 for manipulating the plurality of curved sheets 208. Each of the plurality of curved sheets 208 includes an upper surface 216 and a lower surface 220. In one example, an upper surface 216 is a surface that is to be directly impinged by virtual vertical vectors 224 (see FIG. 6) originating from above the curved sheet 208 and directed downward, and a lower surface 220 is a surface that is to be directly impinged by virtual vertical vectors 228 (see FIG. 6) originating from below the curved sheet 208 and directed upward. The apparatus 212 also includes tooling 232 to be coupled to the upper surface 216 of each of the plurality of curved sheets 208. The tooling 232 is capable of moving the plurality of curved sheets 208 relative to each other and abutting the plurality of curved sheets 208 so that the upper surface 216 of each of the plurality of curved sheets 208 is coextensive with a virtual arcuate surface 236 (see FIGS. 6 and 7). The apparatus 212 may manipulate any number of curved sheets 208. In one example illustrated in FIGS. 5-7, the apparatus 212 manipulates three curved sheets 208. In another example illustrated in FIG. 8, the apparatus 212 manipulates four curved sheets 208. No matter the number of curved sheets 208, the tooling 232 of the apparatus 212 is capable of moving the plurality of curved sheets 208 relative to each other and abutting the plurality of curved sheets 208 so that the upper surface 216 of each of the plurality of curved sheets 208 is coextensive with a virtual arcuate surface 236 (see FIG. 5).

Referring, for example, to FIG. 5, the virtual arcuate surface 236 includes no inflection points along a cross-section thereof perpendicular to a virtual straight line coextensive with the virtual arcuate surface 236. As used herein, an inflection point is a location along a contour where a curvature of the contour changes from concave to convex or vice versa.

With continued reference to FIGS. 6 and 7, in one example, the plurality of curved sheets 208, abutted so that the upper surface 216 of each of the plurality of curved sheets 208 is coextensive with the virtual arcuate surface 236 (see FIG. 5), subtend a central angle between about 2 degrees and about 270 degrees in a virtual plane perpendicular to a virtual straight line coextensive with the virtual arcuate surface 236. In one example, the plurality of curved sheets 208, abutted so that the upper surface 216 of each of the plurality of curved sheets 208 is coextensive with the virtual arcuate surface 236, subtend a central angle of about 180 degrees in a virtual plane perpendicular to a virtual straight line coextensive with the virtual arcuate surface 236. The virtual arcuate surface 236, in some example, may form part or all of a circle, while in other examples, the virtual arcuate surface 236 may approximate a shape of a circle, and in still other examples, the virtual arcuate surface 236 may form part or all of any arcuate shape. Thus, the curved sheets 208 may subtend a central angle associated with a circle, an approximation of a circle, or any other arcuate shape.

Referring to FIGS. 4-8, in one example, the tooling 232 includes at least one holder 240, 243, 245 to be removably coupled to the upper surface 216 of at least one of the plurality of curved sheets 208. The tooling 232 may be removably coupled to at least one of the plurality of curved sheets 208 in a variety of ways and all of such possibilities are intended to be within the spirit and scope of the present disclosure. In one example, the tooling 232 may include one or more suction cups 241 in communication with a vacuum source 242. The vacuum source 242 provides sufficient vacuum pressure to the one or more suction cups 241 to secure the at least one of the plurality of curved sheets 208 to the tooling 232. The vacuum source 242 may be selectively activated and deactivated to respectively supply and interrupt vacuum pressure to the suction cups 241, thereby selectively coupling and uncoupling the tooling 232 to the at least one of the plurality of curved sheets 208. In one example, the at least one holder 243 may extend in a non-perpendicular direction relative to weight vectors 244 (see FIG. 5) of the plurality of curved sheets 208. In one example, the at least one holder 243 may extend in a substantially parallel direction relative to weight vectors 244 of the plurality of curved sheets 208. In one example, the at least one holder 240 may extend in a substantially perpendicular direction relative to weight vectors 244 of the plurality of curved sheets 208. The at least one holder 240 has a selectively variable length.

With continued reference to FIGS. 4-8, in one example, the tooling 232 includes at least one first holder 240 and at least one second holder 243. The at least one first holder 240 and the at least one second holder 243 extend in different directions. In one example, tooling 232 also includes at least one third holder 245. In one aspect, the third holder 245 may extend in a similar direction to one of the first holder 240 and the third holder 243. In another aspect, the third holder 245 may extend in a different direction than the first holder 240 and the second holder 243. The tooling 232 is reconfigurable. Reconfigurable tooling 232 is adjustable to accommodate sheets 208 of varying shapes, sizes, and configurations, as opposed to hard tooling, which has a fixed shape (i.e., not adjustable) and is configured to accommodate only a single shape or configuration of sheets.

Continuing to refer to FIGS. 4-8, in one example, the apparatus 212 also includes a processing station 248 facing the lower surfaces 220 of the plurality of curved sheets 208. In one aspect, the processing station 248 includes a subtractive-manufacturing apparatus 249. The subtractive-manufacturing apparatus 249 may include a drilling apparatus 250. In another aspect, the processing station 248 includes a laser-welding apparatus 251.

With reference to FIGS. 4-8, in one example, the apparatus 212 also includes a carriage 288 configured to move relative to the plurality of curved sheets 208 and the processing station 248 is coupled to and moveable with the carriage 288. The processing station 248 may include a friction-stir-welding apparatus 247. One example of a friction-stir welding apparatus 247 is illustrated in FIG. 17.

With continued reference to FIG. 4 and additional reference to FIGS. 9-11, the apparatus 212 also includes a first magnetic member 252 to be associated with the upper surface 216 of a first curved sheet 208 adjacent an edge 256 of the first curved sheet 208, a second magnetic member 260 to be associated with the lower surface 220 of the first curved sheet 208 adjacent the edge 256 of the first curved sheet 208, a third magnetic member 264 to be associated with the upper surface 216 of a second curved sheet 208 adjacent an edge 256 of the second curved sheet 208, and a fourth magnetic member 268 to be associated with the lower surface 220 of the second curved sheet 208 adjacent the edge 256 of the second curved sheet 208. The first magnetic member 252 is to be magnetically coupled to the second magnetic member 260 and the third magnetic member 264 is to be magnetically coupled to the fourth magnetic member 268 with the edge 256 of the first curved sheet 208 and the edge 256 of the second curved sheet 208 abutting each other.

Referring now to FIGS. 4, 12 and 13, in one example, the apparatus 212 also includes a flexible joining member 272 to be installed between the first magnetic member 252 and the third magnetic member 264 or between the second magnetic member 260 and the fourth magnetic member 268 to provide a coupling between the first curved sheet 208 and the second curved sheet 208 with the edge 256 of the first curved sheet 208 and the edge 256 of the second curved sheet 208 abutting each other. In the illustrated example, the flexible joining member 272 is installed between the first magnetic member 252 and the third magnetic member 264.

With reference to FIGS. 4 and 12-14, in one example, the apparatus 212 also includes a decoupling member 276 (see FIG. 14) rotatably attached to the friction-stir-welding apparatus 247 to eliminate the coupling provided by the flexible joining member 272 between the first curved sheet 208 and the second curved sheet 208. The decoupling member 276 decouples the flexible joining member 272 from the first curved sheet 208 and the second curved sheet 208 while the first curved sheet 208 and the second curved sheet 208 are welded together by the friction-stir-welding apparatus 247. The decoupling member 276 may also translate but does not rotate relative to the first curved sheet 208 and the second curved sheet 208. The decoupling member 276 may be at least partially positioned in a space 280 between the first magnetic member 252 and the third magnetic member 264 and may move along the space 280. The decoupling member 276 is at least partially retained in the space 280 by the first magnetic member 252 and the third magnetic member 264 and may slidably engage at least one of the first magnetic member 252 and the third magnetic member 264. In one aspect, the decoupling member 276 slidably engages both the first magnetic member 252 and the third magnetic member 264. In one example, the friction-stir-welding apparatus 247 is also at least partially positioned in the space 280. A ball bearing or other device may be coupled between the decoupling member 276 and the friction-stir welding apparatus 247 to allow the friction-stir welding apparatus 247 to rotate relative to the decoupling member 276. The decoupling member 276 is guided along the space 280 by slidably engaging edges of the first magnetic member 252 and the third magnetic member 264.

Referring to FIGS. 4, 10 and 12, in one example, the apparatus 212 also includes a rigid joining member 284 coupled to the first curved sheet 208 and to the second curved sheet 208 with the edge 256 of the first curved sheet 208 and the edge 256 of the second curved sheet 208 abutting each other. In one aspect, the rigid joining member 284 includes a curvature 286.

With reference to FIGS. 4-9, 12 and 13, in one example, the apparatus 212 also includes the carriage 288 configured to move relative to the first curved sheet 208 and the second curved sheet 208. The friction-stir-welding apparatus 247 is coupled to and moveable with the carriage 288. Additionally, the second magnetic member 260 and the fourth magnetic member 268 are coupled to and are moveable with the carriage 288. Conversely, the first magnetic member 252 and third magnetic member 264 remain stationary relative to the plurality of curved sheets 208.

Referring now to FIGS. 4-13 and 15, in one example of the present disclosure, the apparatus 212 is configured to constrain the edge 256 of the first curved sheet 208 and the edge 256 of the second curved sheet 208. As described above, the apparatus 212 includes the first magnetic member 252 associated with the upper surface 216 of the first curved sheet 208, the second magnetic member 260 associated with the lower surface 220 of the first curved sheet 208, the third magnetic member 264 associated with the upper surface 216 of the second curved sheet 208, and the fourth magnetic member 268 associated with the lower surface 220 of the second curved sheet 208. The first magnetic member 252 is magnetically coupled to the second magnetic member 260 and the third magnet member 264 is magnetically coupled to the fourth magnetic member 268 with the edge 256 of the first curved sheet 208 and the edge 256 of the second curved sheet 208 abutting each other.

With continued reference to FIGS. 4-13 and 15, in one example, the first magnetic member 252 and the second magnetic member 260 conform to the first curved sheet 208, and the third magnetic member 264 and the fourth magnetic member 268 conform to the second curved sheet 208. The first curved sheet 208 and the second curved sheet 208 may have a wide variety of shapes including, but not limited to, curved, flat, a combination of curved and flat, or any of a wide variety of shapes. Thus, the first magnetic member 252 and the second magnetic member 260 may be configured to conform to any shape of the first curved sheet 208, and the third magnetic member 264 and the fourth magnetic member 268 may be configured to conform to any shape of the second curved sheet 208. In one aspect, at least two of the first magnetic member 252, the second magnetic member 260, the third magnetic member 264, and the fourth magnetic member 268 have a compliant shape. In one aspect, the first curved sheet 208 and the second curved sheet 208 are curved metallic sheets 208. In such an aspect, the at least two of the first magnetic member 252, the second magnetic member 260, the third magnetic member 264, and the fourth magnetic member 268 (e.g., the first magnetic member 252 and the third magnetic member 264) are compliant to the shapes of the curved metallic sheets 208.

With continued reference to FIGS. 4-13 and 15, in one example, the first magnetic member 252 and the second magnetic member 260 are located adjacent the edge 256 of the first curved sheet 208, and the third magnetic member 264 and the fourth magnetic member 268 are located adjacent the edge 256 of the second curved sheet 208. In one aspect, the first magnetic member 252, the second magnetic member 260, the third magnetic member 264, and the fourth magnetic member 268 comprise permanent magnets. In another aspect, one of the first magnetic member 252 and the second magnetic member 260 comprises a permanent magnet and another of the first magnetic member 252 and the second magnetic member 260 comprises a ferromagnetic material, and one of the third magnetic member 264 and the fourth magnetic member 268 comprises a permanent magnet and another of the third magnetic member 264 and the fourth magnetic member 268 comprises a ferromagnetic material. In another aspect, at least one of the first magnetic member 252 and the second magnetic member 260 comprises an electro-magnet, and at least one of the third magnetic member 264 and the fourth magnetic member 268 comprises an electro-magnet. In one aspect, the at least one electro-magnet is selectively activated and deactivated. In another aspect, the second magnetic member 260 and the fourth magnetic member 268 are electro-magnets and the first magnetic member 252 and the third magnetic member 264 are one of an electro-magnet, a permanent magnet, or at least partially comprised of a ferromagnetic material.

Referring now to FIGS. 4 and 12-15, in one example, the apparatus 212 also includes a joining member to be coupled to the first curved sheet 208 and the second curved sheet 208. In one example, the joining member is the flexible joining member 272 installed between one of the first magnetic member 252 and the third magnetic member 264 or the second magnetic member 260 and the fourth magnetic member 268 to provide a coupling between the first curved sheet 208 and the second curved sheet 208 with the edge 256 of the first curved sheet 208 and the edge 256 of the second curved sheet 208 abutting each other. In one aspect, the flexible joining member 272 is installed between the first magnetic member 252 and the third magnetic member 264. In another aspect, the flexible joining member 272 is installed between the second magnetic member 260 and the fourth magnetic member 268.

With continued reference to FIGS. 4 and 12-15, in one example, the flexible joining member 272 includes adhesive 292 on at least a portion thereof, and the flexible joining member 272 is coupled to the first curved sheet 208 and the second curved sheet 208 with the adhesive 292. The adhesive 292 is located on the joining member 272 adjacent a first edge 296 (see FIG. 12) and a second edge 300 (see FIG. 12) of the joining member 272. The first edge 296 and the second edge 300 of the flexible joining member 272 oppose one another, with the first edge 296 adhesively coupled to the first curved sheet 208 and the second edge 300 adhesively coupled to the second curved sheet 208. In one example, the flexible joining member 272 includes a portion 304 lacking adhesive. The portion 304 lacking adhesive is between the first edge 296 and the second edge 300 of the flexible joining member 272 and may at least partially overlap the edge 256 of the first curved sheet 208 and the edge 256 of the second curved sheet 208, with the edge 256 of the first curved sheet 208 and the edge 256 of the second curved sheet 208 abutting each other.

With reference to FIGS. 10, 12 and 15, in one example, the joining member is a rigid joining member 284 and may be coupled to the first curved sheet 208 and the second curved sheet 208. The rigid joining member 284 may be coupled to the first curved sheet 208 and the second curved sheet 208 in a variety of ways, all of which are intended to be within the spirit and scope of the present disclosure. For example, the rigid joining member 284 may be coupled to the first curved sheet 208 and the second curved sheet 208 by at least one of fastening and welding. In one aspect, the rigid joining member 284 is coupled to the upper surface 216 of the first curved sheet 208 and the upper surface 216 of the second curved sheet 208. In another aspect, the rigid joining member 284 is coupled to the lower surface 220 of the first curved sheet 208 and the lower surface 220 of the second curved sheet 208. The rigid joining member 284 may include a slot 308 (see FIGS. 10 and 13) and may include a curvature 286.

Referring to FIGS. 4, 10 and 12-15, in one example, the apparatus 212 includes a first joining member and a second joining member. The first joining member and the second joining member are configured to be coupled to the first curved sheet 208 and the second curved sheet 208, with the edge 256 of the first curved sheet 208 and the edge 256 of the second curved sheet 208 abutting each other. In one example, the first joining member is the rigid joining member 284 and the second joining member is the flexible joining member 272.

With reference to FIGS. 4-13 and 15, in one example, the space 280 may be provided between the first magnetic member 252 and the third magnetic member 264, and the apparatus 212 includes the joining member (one or both joining members 272 and 284) coupled to the first curved sheet 208 and the second curved sheet 208 and extending at least partially across the space 280 between the first magnetic member 252 and the third magnetic member 264. In one example, the apparatus 212 also includes the carriage 288 configured to move relative to the first curved sheet 208 and the second curved sheet 208. The second magnetic member 260 and the fourth magnetic member 268 are coupled to the carriage 288. The second magnetic member 260 and the fourth magnetic member 268 are configured to move with the carriage 288 relative to the first curved sheet 208 and the second curved sheet 208, and the first magnetic member 252 and the third magnetic member 264 remain stationary relative to the first curved sheet 208 and the second curved sheet 208.

Referring to FIGS. 13 and 15, in one example, the apparatus 212 also includes at least one friction-reducing member 312. At least a portion of the at least one friction-reducing member 312 is between at least one of the second magnetic member 260 and the fourth magnetic member 268 and at least one of the first curved sheet 208 and the second curved sheet 208. In one aspect, the friction-reducing member 312 is a wheel 313. A spacing 314 between a portion of the at least one of the second magnetic member 260 and the fourth magnetic member 268 and the at least one of the first curved sheet 208 and the second curved sheet 208 is maintained with the friction reducing member 312 engaging at least one of the first curved sheet 208 and the second curved sheet 208. In another aspect, the friction-reducing member 312 is a layer 315 of material (e.g., hard plastic) applied to a surface of one of the second magnetic member 260 and the fourth magnetic member 268. In one example, the apparatus 212 may include a plurality of friction-reducing members 312. One of the plurality of friction reducing members 312 may be between the second magnetic member 260 and the first curved sheet 208 and another one of the plurality of friction-reducing members 312 may be between the fourth magnetic member 268 and the second curved sheet 208. The apparatus 212 may include any number of friction-reducing members 312 and any number of friction-reducing members 312 may be between one of the magnetic members and one of the curved sheets 208.

With reference to FIGS. 4, 9-13 and 15, in one example, the first magnetic member 252 includes a substrate 316 configured to engage the upper surface 216 of the first curved sheet 208 and the third magnetic member 264 includes a substrate 320 (see FIG. 10) configured to engage the upper surface 216 of the second curved sheet 208. The substrate 316 of the first magnetic member 252 is configured to conform to the first curved sheet 208 and the substrate 320 of the third magnetic member 264 is configured to conform to the second curved sheet 208. The substrate 316 of the first magnetic member 252 and the substrate 320 of the third magnetic member 264 are flexible. The substrates 316 and 320 of the first magnetic member 252 and the third magnetic member 264, respectively, may be comprised of a variety of elements and/or materials and all of such elements and/or materials are intended to be within the spirit and scope of the present disclosure. For example, the substrates 316, 320 may be comprised of spring steel, plastic, rubber, metal, netting, mesh, etc. The substrates 316, 320 may also include one or more grooves 324 (see FIG. 15) defined in a surface thereof. The grooves 324 may be defined in the surface of the substrates 316, 320 that engages the curved sheet 208. The grooves 324 may assist the substrates 316, 320 in conforming to the curved sheets 208 with which the substrates 316, 320 engages. The grooves 324 may be defined in the surface of the substrates 316, 320 in any orientation such as, for example, longitudinal, transverse to a longitudinal extent of the substrates 316, 320, diagonal, perpendicular to the longitudinal extent of the substrates 316, 320, etc. or a combination thereof. The grooves 324 may also have any of a wide variety of cross-sectional shapes taken along a plane perpendicular to a longitudinal extent of the grooves 324. For example, cross-sections of the grooves 324 may be, but not limited to, triangular, square, rectangular, polygonal, semi-circular, any arcuately perimetered shape, or any shape having a perimeter comprised of a combination of arcs and straight lines.

Referring to FIGS. 4, 9-13 and 15, in one example, the first magnetic member 252 includes a plurality of magnetic tiles 328 coupled to the substrate 316 of the first magnetic member 252, and the third magnetic member 264 includes a plurality of magnetic tiles 328 coupled to the substrate 320 of the third magnetic member 264. The plurality of magnetic tiles 328 coupled to the substrate 316 of the first magnetic member 252 are spaced apart from one another, and the plurality of magnetic tiles 328 coupled to the substrate 320 of the third magnetic member 264 are spaced apart from one another. The magnetic tiles 328 may be comprised of permanent magnets, electromagnets, ferromagnetic material, or any other material have magnetic selectively magnetic characteristics. Moreover, any number of magnetic tiles 328, including one, may be coupled to each of the substrates 316 and 320 of the first magnetic member 252 and the third magnetic member 264, respectively. In the illustrated example, the magnetic tiles 328 are substantially square in shape. However, the magnetic tiles 328 may have any shape including, but not limited to, rectangular, circular, ovular, triangular, polygonal, or any shape having an arcuate perimeter, a perimeter comprised of straight lines, or a perimeter comprised of both arcs and straight lines. The magnetic tiles 328 may also be coupled to the substrates 316 and 320 of the first magnetic member 252 and the third magnetic member 264 in a variety of ways including, but not limited to, bonding, fastening, fusing, unitary forming (as one-piece), or in any other manners. The magnetic tiles 328 may also be spaced apart from one another at any distance. In one example, the magnetic tiles 328 are spaced-apart by about 0.02 inches (0.508 mm). In another example, the magnetic tiles 328 are spaced-apart by less than 0.25 inches (6.35 mm). In a further example, the magnetic tiles 328 are spaced-apart by less than 1 inch (25.4 mm). In still another example, the magnetic tiles 328 are spaced-apart by less than 10 inches (254 mm). The magnetic tiles 328 may also have a variety of sizes (e.g., height and length). In one example, the height of one of the tiles 328 may be about 0.75 inches (19.05 mm) and the length of one of the tiles 328 may be about 0.05 inches (1.27 mm). In another example, the height of one of the tiles 328 is less than 5 inches (127 mm) and the length of one of the tiles 328 is less than 5 inches (127 mm). In a further example, the height of one of the tiles 328 is less than 12 inches (304.8 mm) and the length of one of the tiles 328 is less than 12 inches (304.8 mm). The substrates 316, 320 of the first magnetic member 252 and the third magnetic member 264 may have a variety of different thicknesses, any possibility of which is intended to be within the spirit and scope of the present disclosure. In one example, the thickness of the substrates 316, 320 is about 0.01 inches (0.254 mm). In another example, the thickness of the substrates 316, 320 is less than 1 inch (25.4 mm). In a further example, the thickness of the substrates 316, 320 is less than 5 inches (127 mm).

With reference to FIGS. 3 and 16, one example of the present disclosure relates to the vehicle 200, which includes the substructure 206 and a weldment 332 coupled to the substructure 206. The weldment 332 includes the first sheet 208, the second sheet 208, and a butt weld 336 (see FIG. 16) between the first sheet 208 and the second sheet 208. The butt weld 336 is formed before the weldment 332 is coupled to the substructure 206. In one aspect, the vehicle 200 is an airplane 200. In one aspect, the substructure 206 is at least a portion of the frame 204 of the airplane 200. In one aspect, the first sheet 208 is a first metallic fuselage sheet 208 and the second sheet 208 is a second metallic fuselage sheet 208. In one aspect, the first sheet 208 is one of a first metallic fuselage sheet 208, a first metallic wing sheet 208, and a first metallic stabilizer sheet 208, and the second sheet 208 is a second metallic fuselage sheet 208, a second metallic wing sheet 208, and a second metallic stabilizer sheet 208.

In FIGS. 4, 15 and 16, lines connecting various elements and/or components of the vehicle 200 or the apparatus 212 may represent mechanical, electrical, fluid, optical, electromagnetic and other couplings and/or combinations thereof. Couplings other than those depicted in FIG. 3 may also exist. Dashed lines connecting the various elements and/or components of the vehicle 200 or the apparatus 212 may represent couplings similar in function and purpose to those represented by solid lines; however, couplings represented by the dashed lines are either selectively provided or relate to alternative or optional aspects of the disclosure. Likewise, elements and/or components of the vehicle 200 or the apparatus 212 represented in dashed lines represent alternative or optional aspects of the disclosure. Moreover, the absence of lines between various elements and/or components of the vehicle 200 or the apparatus 212 does not imply an absence of a relationship, an association, or a coupling between the elements and/or components of the vehicle 200 or the apparatus 212. Rather, a relationship, an association, and/or a coupling may be present between any of the elements and/or components of the vehicle 200 or the apparatus 212.

The following description pertains to examples of methods and processes associated with the examples of vehicle and/or apparatuses described and illustrated in the figures. While particular steps and functionality are described herein, such steps and functionality are merely examples and are not intended to be limiting. Rather, the vehicle and/or apparatuses are intended to include more, fewer, and different steps and functionality, and all of such possibilities are intended to be within the spirit and scope of the present disclosure.

An example of the present disclosure relates to a method of manufacturing an assembly including the first curved sheet 208 and the second curved sheet 208. In an example of the method, the first curved sheet 208 includes a first upper surface 216 and a first edge 256, and the second curved sheet 208 includes a second upper surface 216 and a second edge 256. The method includes supporting the first upper surface 216 and the second upper surface 216 (see FIG. 5), abutting the first edge 256 and the second edge 256 so that the first upper surface 216 and the second upper surface 216 are coextensive with a virtual arcuate surface 236 (see FIG. 6), and welding the first edge 256 and the second edge 256 together to create a weldment 332 after abutting the first edge 256 and the second edge 256 (see FIG. 6). In one aspect, the virtual arcuate surface 236 includes no inflection points along a cross-section thereof perpendicular to a virtual straight line coextensive with the virtual arcuate surface 236 (see FIGS. 6 and 7). In one example, the method also includes constraining the first edge 256 and the second edge 256 subsequent to abutting the first edge 256 and the second edge 256 and prior to welding (see FIGS. 6 and 9-13).

In variant example, the method also includes reconfiguring tooling 232 supporting the first upper surface 216 and the second upper surface 216.

In one aspect, the method also includes positioning a processing station 248 to face a first lower surface 220 of the first curved sheet 208 and a second lower surface 220 of the second curved sheet 208 (see FIGS. 5-9 and 12). In one variant, the method also includes moving the processing station 248 relative to the first curved sheet 208 and the second curved sheet 208. In one example of the method, positioning the processing station 248 also includes positioning a friction-stir-welding apparatus 247 to face the first lower surface 220 and the second lower surface 220. In one example, the method also includes locating the first magnetic member 252 relative to the first upper surface 216 adjacent the first edge 256, locating the second magnetic member 260 relative to the first lower surface 220 adjacent the first edge 256, locating the third magnetic member 264 relative to the second upper surface 216 adjacent the second edge 256, locating the fourth magnetic member 268 relative to the second lower surface 220 adjacent the second edge 256, and magnetically coupling the first magnetic member 252 to the second magnetic member 260 and the third magnetic member 264 to the fourth magnetic member 268 after abutting the first edge 256 and the second edge 256 (see FIGS. 6, 7 and 9-13). In one example, the method also includes coupling a flexible joining member 272 to the first curved sheet 208 and to the second curved sheet 208 between at least one of the first magnetic member 252 and the third magnetic member 264 or the second magnetic member 260 and the fourth magnetic member 268 after abutting the first edge 256 and the second edge 256 (see FIGS. 12-14). In one example of the method, the flexible joining member 272 is coupled to the first curved sheet 208 and the second curved sheet 208 between the first magnetic member 252 and the third magnetic member 264 (see FIGS. 12-14). In one variant, the method also includes decoupling the flexible joining member 272 from the first curved sheet 208 and the second curved sheet 208 (see FIGS. 13 and 14). In one example of the method, decoupling also includes decoupling the flexible joining member 272 from the first curved sheet 208 and the second curved sheet 208 while welding the first edge 256 and the second edge 256 (see FIG. 14). In one aspect, the method also includes rotatably coupling a decoupling member 276 to the friction-stir-welding apparatus 247 (see FIG. 14). In one variant, the method also includes coupling a rigid joining member 284 to the first curved sheet 208 and the second curved sheet 208 after abutting the first edge 256 and the second edge 256 (see FIGS. 10 and 13). In one aspect, the rigid joining member 284 includes a curvature 286. In one example, the method also includes moving the friction-stir-welding apparatus 247 relative to the first curved sheet 208 and the second curved sheet 208. In one variant, the method also includes moving the second magnetic member 260 and fourth magnetic member 268 relative to the first curved sheet 208 and the second curved sheet 208.

In one example, the method also includes locating the first magnetic member 252 relative to at least one of the first upper surface 216 and the second upper surface 216 adjacent at least one of the first edge 256 and the second edge 256, locating the second magnetic member 260 relative to at least one of a first lower surface 220 of the first curved sheet 208 and a second lower surface 220 of the second curved sheet 208 adjacent at least one of the first edge 256 and the second edge 256, and magnetically coupling the first magnetic member 252 to the second magnetic member 260 (see FIGS.

9-13). In one variant, the method also includes locating the first magnetic member 252 and the second magnetic member 260 relative to a same one of the first curved sheet 208 and the second curved sheet 208 (see FIGS. 9-13).

In one aspect, the method also includes providing a space between the first edge 256 and the second edge 256 (see FIGS. 5 and 8) and processing at least one of the first edge 256 and the second edge 256 (see FIG. 5). The space is sufficient to process at least one of the first edge 256 and the second edge 256. In one example of the method, abutting the first edge 256 and the second edge 256 occurs subsequent to processing at least one of the first edge 256 and the second edge 256 (see FIG. 6).

In one variant of the method, supporting the first upper surface 216 and the second upper surface 216 further includes coupling tooling 232 to the first upper surface 216 and the second upper surface 216 (see FIGS. 5-8). In one aspect, the method also includes moving the first curved sheet 208 and the second curved sheet 208 relative to each other with the tooling 232 (see FIGS. 5 and 6). In one example of the method, abutting also includes abutting the first edge 256 and the second edge 256 with the tooling 232 (see FIG. 6).

In one aspect, the method also includes coupling the weldment 332 to a structure 206 (see FIGS. 3 and 16). In one example, the structure 206 is at least a portion of the frame 204 of an aircraft 200 (see FIGS. 3 and 16).

In one variant, the method also includes processing the weldment 332 (see FIG. 7). In one aspect of the method, processing the weldment 332 includes performing gauge reduction on at least a portion of the weldment 332. In another example of the method, processing the weldment 332 includes reducing the thickness of at least a portion of the weldment 332. In another aspect of the method, processing the weldment 332 includes trimming at least a portion of the weldment 332.

As realized herein, a variety of different aspects, examples, and variants of the apparatus and methods are disclosed herein that include a variety of components, features, and functionality. It should be understood that the various aspects, examples, and variants of the apparatus and methods disclosed herein are capable of including any of the components, features, and functionality of any of the other aspects, examples, and alternatives of the apparatus and methods disclosed herein in any combination, and all of such possibilities are intended to be within the spirit and scope of the present disclosure. The terms "aspect", "example" and "variant" hereinabove are used interchangeably.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An apparatus for manipulating a plurality of curved sheets, wherein the plurality of curved sheets comprises a first curved sheet and a second curved sheet, wherein the first curved sheet comprises a first upper surface, a first lower surface, and a first edge, and wherein the second curved sheet comprises a second upper surface, a second lower surface, and a second edge, the apparatus comprising:

a housing;

first holders extending from the housing in a first direction, wherein the first holders are configured to be removably coupled to the first upper surface of the first curved sheet, and wherein the first holders are individually movable along the first direction to position the first curved sheet such that the first upper surface is coextensive with a first portion of a virtual arcuate surface;

second holders extending from the housing in a second direction, wherein the second holders are configured to be removably coupled to the second upper surface of the second curved sheet, and wherein the second holders are individually movable along the second direction to position the second curved sheet such that the second upper surface is coextensive with a second portion of the virtual arcuate surface and such that the second edge is abutting the first edge;

a carriage disposed in a facing relationship with the first lower surface of the first curved sheet and the second lower surface of the second curved sheet, wherein the carriage is operable to move along the first edge and the second edge of the first curved sheet and the second curved sheet when the first edge and the second edge are abutting one another;

a processing station coupled to the carriage, wherein the processing station is movable with the carriage, and wherein the processing station comprises a welding apparatus operable to weld the first edge and the second edge as the carriage moves along the first edge of the first curved sheet and along the second edge of the second curved sheet when the first edge and the second edge are abutting one another;

a first magnetic member, configured to be positioned on the first upper surface of the first curved sheet adjacent the first edge;

a second magnetic member coupled to the carriage, wherein the second magnetic member magnetically couples to the first magnetic member when the first magnetic member is positioned on the first upper surface of the first curved sheet, and wherein the second magnetic member is movable with the carriage;

a third magnetic member, configured to be positioned on the second upper surface of the second curved sheet adjacent the second edge, and a fourth magnetic member coupled to the carriage, wherein the fourth magnetic member magnetically couples to the third magnetic member when the third magnetic member is positioned on the second upper surface of the second curved sheet, and wherein the fourth magnetic member is movable with the carriage.

2. The apparatus of claim 1, wherein the virtual arcuate surface includes no inflection points along a cross-section thereof perpendicular to a virtual straight line coextensive with the virtual arcuate surface.

3. The apparatus of claim 1, wherein the plurality of curved sheets, abutted so that upper surfaces of the plurality of curved sheets are coextensive with the virtual arcuate surface, subtend a central angle between about 2 degrees and about 270 degrees in a virtual plane perpendicular to a virtual straight line coextensive with the virtual arcuate surface.

4. The apparatus of claim 1, further comprising a flexible joining member, configured to be installed between the first magnetic member and the third magnetic member or between the second magnetic member and the fourth magnetic member to provide a coupling between the first curved sheet and the second curved sheet with the first edge of the first curved sheet and the second edge of the second curved sheet abutting each other.

5. The apparatus of claim 4, wherein the welding apparatus comprises a friction-stir-welding apparatus, and wherein the apparatus further comprising a decoupling member rotatably attached to the friction-stir-welding apparatus to eliminate the coupling provided by the flexible joining member between the first curved sheet and the second curved sheet.

6. The apparatus of claim 1, further comprising a rigid joining member, configured to be installed between the first magnetic member and the third magnetic member or between the second magnetic member and the fourth magnetic member to provide a coupling between the first curved sheet and the second curved sheet with the first edge of the first curved sheet and the second edge of the second curved sheet abutting each other.

7. The apparatus of claim 1, further comprising:
 a flexible joining member, configured to be installed between one of the first magnetic member and the third magnetic member or the second magnetic member and the fourth magnetic member to provide a first coupling between the first curved sheet and the second curved sheet with the first edge of the first curved sheet and the second edge of the second curved sheet abutting each other; and
 a rigid joining member, configured to be installed between a remaining one of the first magnetic member and the third magnetic member or the second magnetic member and the fourth magnetic member to provide a second coupling between the first curved sheet and the second curved sheet with the first edge of the first curved sheet and the second edge of the second curved sheet abutting each other.

8. The apparatus of claim 1, further comprising:
 a first friction-reducing member disposed between the second magnetic member and the first lower surface of the first curved sheet; and
 a second friction-reducing member disposed between the fourth magnetic member and the second lower surface of the second curved sheet.

9. The apparatus of claim 8, wherein the first friction-reducing member and the second friction-reducing member comprise wheels.

10. The apparatus of claim 9, wherein the first friction-reducing member and the second friction-reducing member comprise layers of material applied to respective surfaces of the second magnetic member and the fourth magnetic member.

11. The apparatus of claim 9, wherein the first friction-reducing member maintains a first spacing between the second magnetic member and the first lower surface of the first curved sheet, and wherein the second friction-reducing member maintains a second spacing between the fourth magnetic member and the second lower surface of the second curved sheet.

12. The apparatus of claim 1, further comprising a plurality of third holders extending from the housing in a third direction.

13. The apparatus of claim 2, further comprising a plurality of third holders extending from the housing in a third direction.

14. The apparatus of claim 1, wherein the first magnetic member comprises a first plurality of magnetic tiles coupled to a first flexible substrate, and wherein the third magnetic member comprises a second plurality of magnetic tiles coupled to a second flexible substrate.

15. An apparatus for manipulating a plurality of curved sheets, wherein the plurality of curved sheets comprises a first curved sheet and a second curved sheet, wherein the first curved sheet comprises a first upper surface, a first lower surface, and a first edge, and wherein the second curved sheet comprises a second upper surface, a second lower surface, and a second edge, the apparatus comprising:
 a housing;
 first holders extending from the housing in a first direction, wherein the first holders are configured to be removably coupled to the first upper surface of the first curved sheet, and wherein the first holders are individually movable along the first direction to position the first curved sheet in a first position or in a second position, wherein the first upper surface of the first curved sheet is coextensive with a first portion of a virtual arcuate surface in the second position;
 second holders extending from the housing in a second direction, wherein the second holders are configured to be removably coupled to the second upper surface of the second curved sheet, and wherein the second holders are individually movable along the second direction to position the second curved sheet in a third position or in a fourth position, wherein the second edge of the second curved sheet is spaced apart from the first edge when the first curved sheet is in the first position and the second curved sheet is in the third position, wherein the second upper surface of the second curved sheet is coextensive with a second portion of the virtual arcuate surface in the fourth position, and wherein the first edge is abutting the second edge when the first curved sheet is in the second position and the second curved sheet is in the fourth position;
 a carriage disposed in a facing relationship with the first lower surface of the first curved sheet and the second lower surface of the second curved sheet, wherein the carriage is operable to move along the first edge of the first curved sheet and the second edge of the second curved sheet when the first curved sheet and the second curved sheet are, respectively, in the second position and the fourth position;
 a processing station coupled to the carriage, wherein the processing station is movable with the carriage along the first edge of the first curved sheet and the second edge of the second curved sheet when the first curved sheet and the second curved sheet are, respectively, in the second position and the fourth position, and wherein the processing station comprises:
- a subtractive-manufacturing apparatus operable to process one of the first edge and the second edge when the first curved sheet is in the first position and the second curved sheet is in the third position; and
- a welding apparatus operable to weld the first edge and the second edge as the carriage moves along the first edge and the second edge when the first curved sheet and the second curved sheet are, respectively, in the second position and the fourth position and the first edge and the second edge abut each other;
- a first magnetic member, configured to be positioned on the first upper surface of the first curved sheet adjacent the first edge;
- a second magnetic member coupled to the carriage, wherein the second magnetic member magnetically couples to the first magnetic member when the first magnetic member is positioned on the first upper surface of the first curved sheet, and wherein the second magnetic member is movable with the carriage;
- a third magnetic member, configured to be positioned on the second upper surface of the second curved sheet adjacent the second edge; and
- a fourth magnetic member coupled to the carriage, wherein the fourth magnetic member magnetically couples to the third magnetic member when the third magnetic member is positioned on the second upper surface of the second curved sheet, and wherein the fourth magnetic member is movable with the carriage.

16. The apparatus of claim 15, wherein the first magnetic member is configured to be positioned on the first upper surface of the first curved sheet after the first holders move the first curved sheet to the second position, and wherein the second magnetic member is configured to be positioned on the second upper surface of the second curved sheet after the second holders move the second curved sheet to the fourth position.

17. The apparatus of claim 15, further comprising a flexible joining member, configured to be installed between the first magnetic member and the third magnetic member or between the second magnetic member and the fourth magnetic member after the first curved sheet and second curved sheet are moved to the second position and the fourth position, respectively, to provide a coupling between the first curved sheet and the second curved sheet with the first edge of the first curved sheet and the second edge of the second curved sheet abutting each other.

18. The apparatus of claim 17, wherein the welding apparatus comprises a friction-stir-welding apparatus, and wherein the apparatus further comprising a decoupling member rotatably attached to the friction-stir-welding apparatus to eliminate the coupling provided by the flexible joining member between the first curved sheet and the second curved sheet.

19. The apparatus of claim 15, further comprising a rigid joining member, configured to be installed between the first magnetic member and the third magnetic member or between the second magnetic member and the fourth magnetic member after the first curved sheet and the second curved sheet are moved to the second position and the fourth position, respectively, to provide a coupling between the first curved sheet and the second curved sheet with the first edge of the first curved sheet and the second edge of the second curved sheet abutting each other.

20. The apparatus of claim 15, further comprising:
- a flexible joining member, configured to be installed between one of the first magnetic member and the third magnetic member or the second magnetic member and the fourth magnetic member after the first curved sheet and the second curved sheet are moved to the second position and the fourth position, respectively, to provide a first coupling between the first curved sheet and the second curved sheet with the first edge of the first curved sheet and the second edge of the second curved sheet abutting each other; and
- a rigid joining member, configured to be installed between a remaining one of the first magnetic member and the third magnetic member or the second magnetic member and the fourth magnetic member after the first curved sheet and the second curved sheet are moved to the second position and the fourth position, respectively, to provide a second coupling between the first curved sheet and the second curved sheet with the first edge of the first curved sheet and the second edge of the second curved sheet abutting each other.

* * * * *